(12) United States Patent
Robinson et al.

(10) Patent No.: US 9,436,958 B2
(45) Date of Patent: Sep. 6, 2016

(54) RECEIVING AND QUEUING REQUESTS FROM HOSPITALITY CUSTOMERS

(71) Applicant: Monscierge, LLC, Oklahoma City, OK (US)

(72) Inventors: Marcus Lee Robinson, Edmond, OK (US); Nathaniel Paul Lewis, Madison, WI (US); John Spencer Ready, Oklahoma City, OK (US); Kenneth Richard Marold, Norman, OK (US); James Russell Texter, III, Jenks, OK (US)

(73) Assignee: MONSCIERGE, INC., Oklahoma City, OK (US)

( * ) Notice: Subject to any disclaimer, the term of this patent is extended or adjusted under 35 U.S.C. 154(b) by 27 days.

(21) Appl. No.: 13/842,177

(22) Filed: Mar. 15, 2013

(65) Prior Publication Data
US 2014/0279244 A1 Sep. 18, 2014

(51) Int. Cl.
G06Q 30/00 (2012.01)
G06Q 30/06 (2012.01)
H04W 4/02 (2009.01)

(52) U.S. Cl.
CPC ........... *G06Q 30/0623* (2013.01); *H04W 4/02* (2013.01)

(58) Field of Classification Search
CPC .................................................... H04W 4/02
See application file for complete search history.

(56) References Cited

U.S. PATENT DOCUMENTS

| | | | |
|---|---|---|---|
| 6,965,865 B2 | 11/2005 | Pletz et al. | |
| 7,373,304 B1 | 5/2008 | Pletz et al. | |
| 7,945,477 B2 | 5/2011 | Werbitt | |
| 8,107,934 B1 | 1/2012 | Harris et al. | |
| 8,160,614 B2 | 4/2012 | Shaffer et al. | |
| 2002/0142841 A1 | 10/2002 | Boushy | |
| 2004/0078209 A1 | 4/2004 | Thomson | |
| 2007/0038727 A1 | 2/2007 | Bailey et al. | |
| 2007/0192277 A1 | 8/2007 | Jackson | |
| 2008/0097769 A1 | 4/2008 | Galvin et al. | |
| 2010/0057501 A1* | 3/2010 | Mohammed | 705/5 |
| 2011/0105150 A1* | 5/2011 | Moon et al. | 455/456.3 |
| 2012/0278199 A1* | 11/2012 | Werbitt | 705/26.8 |
| 2013/0173390 A1* | 7/2013 | Polo | 705/14.58 |

FOREIGN PATENT DOCUMENTS

EP 1 569 096 A1 8/2005

OTHER PUBLICATIONS

Co-pending U.S. Appl. No. 13/842,367 inventors Robinson et al., filed Mar. 15, 2013.

* cited by examiner

*Primary Examiner* — Jason Dunham
*Assistant Examiner* — Anand Loharikar
(74) *Attorney, Agent, or Firm* — Sterne, Kessler, Goldstein & Fox P.L.L.C.

(57) ABSTRACT

System, method, and computer program product embodiments for receiving customer requests use a request management system. An embodiment operates by establishing a connection with a customer's mobile device, obtaining information about the location of the customer's mobile device, providing to the customer's mobile device a set of data describing goods or services currently offered by one or more business locations, receiving from the customer's mobile device a request for a good or service offered by a particular business location, and adding the request to a queue associated with one or more groups assigned to fulfill the request based on the request type.

20 Claims, 46 Drawing Sheets

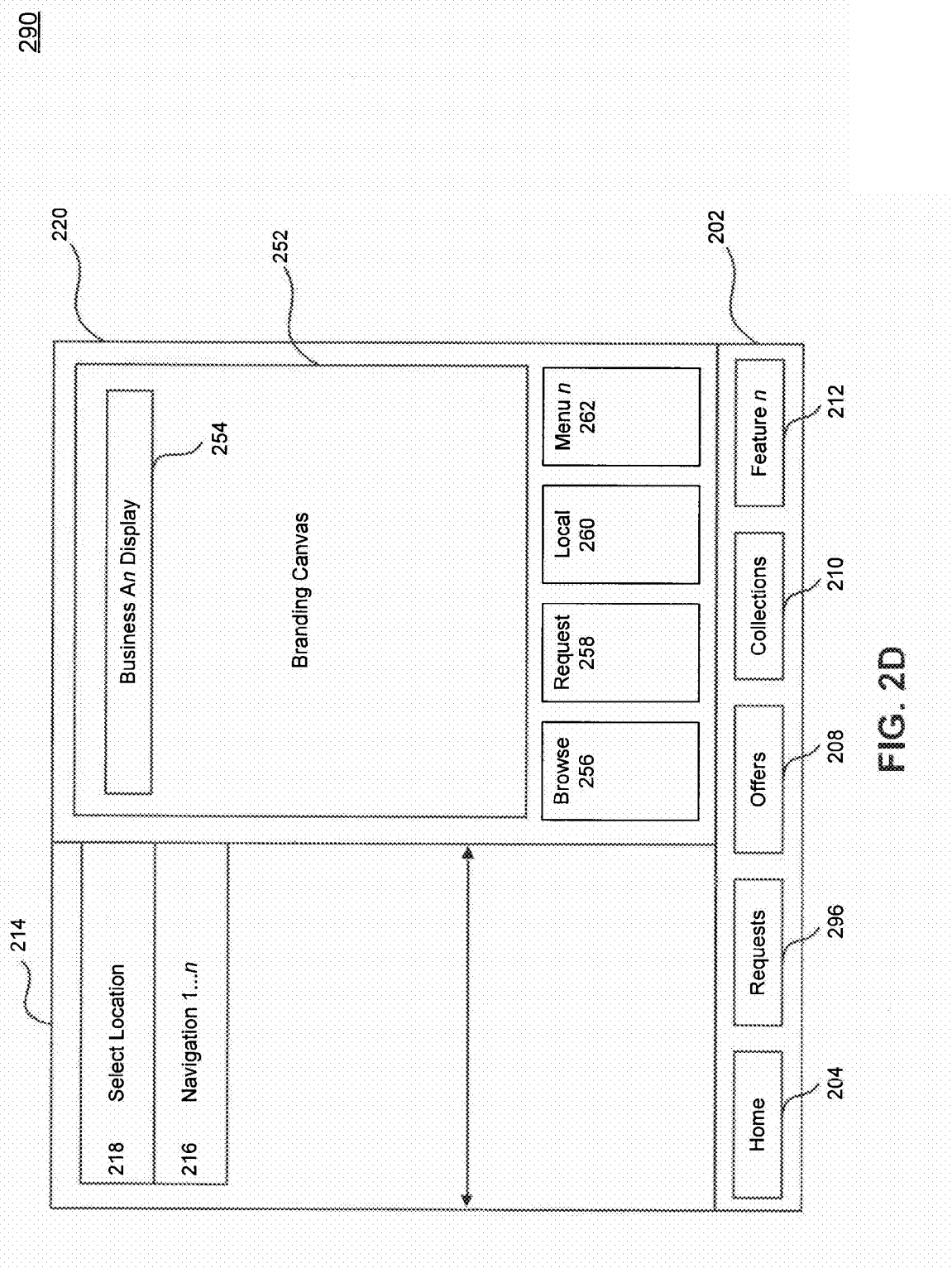

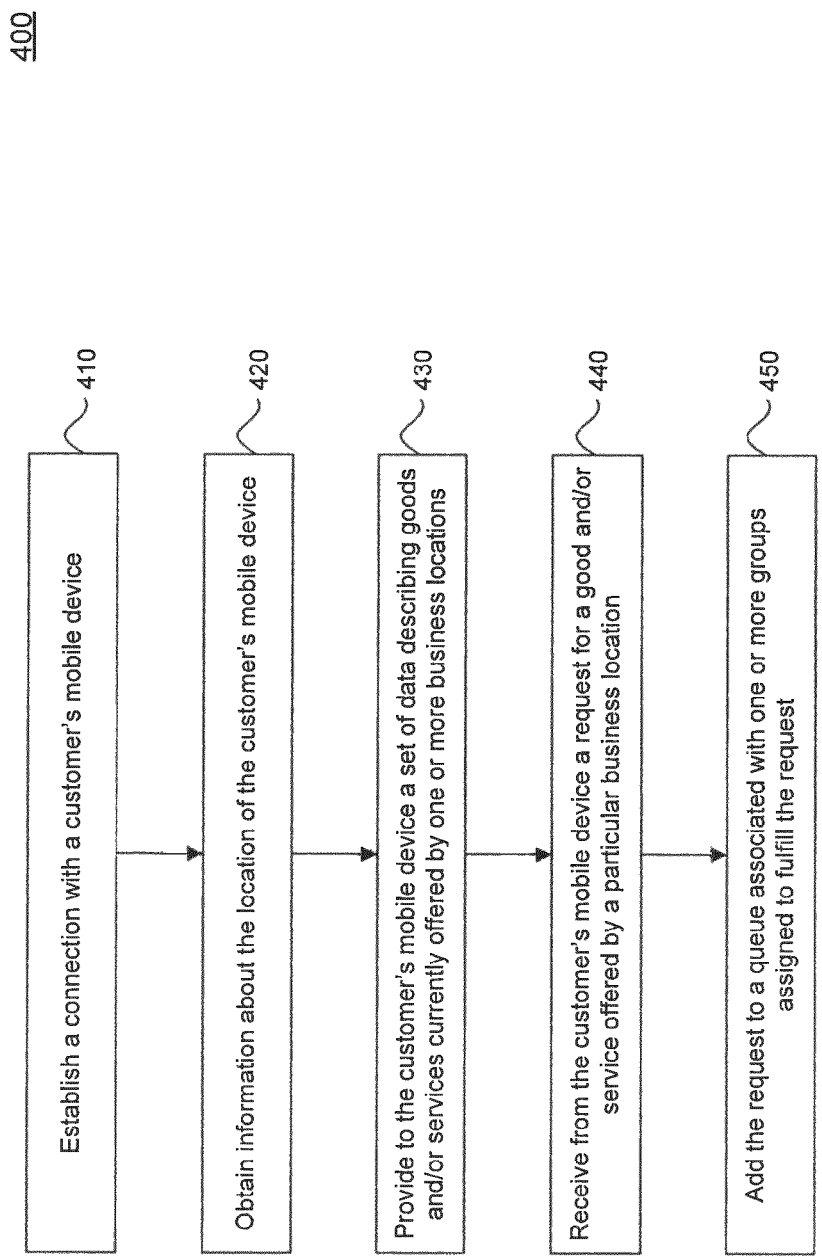

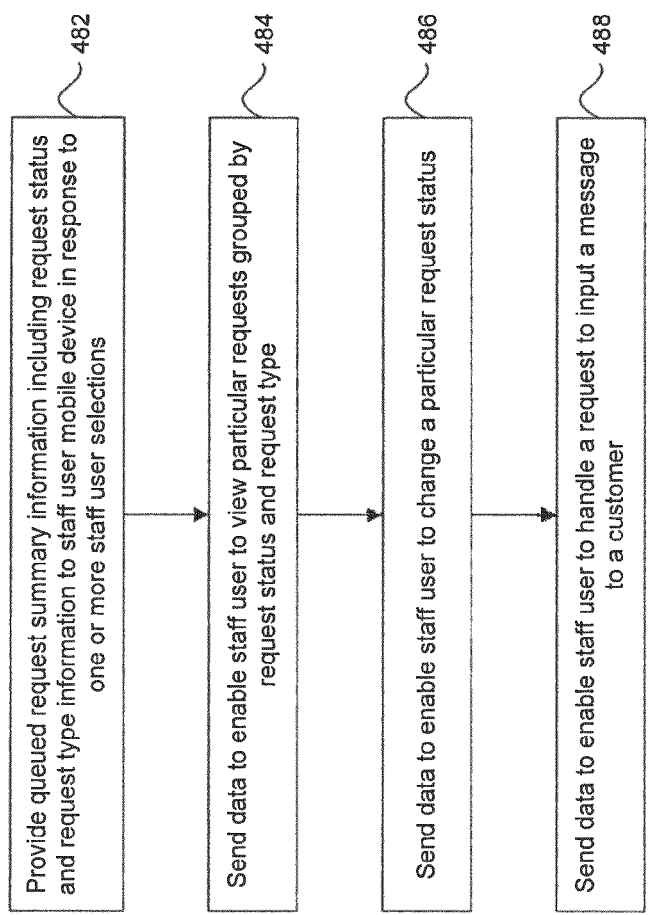

Connect: Home Page
The Request button is pressed

Connect: Home Page
Guests press the Requests button to submit a request

Connect: Guest Services

This is a continuation of the screenshot seen to the left.

Connect: Guest Services

After pressing the Requests button, users are brought to the Guest Services page

Connect: Guest Services: Shampoo & Conditioner

After text is entered, the Done button is pressed

Connect: Guest Services: Shampoo & Conditioner

Text is entered into the Special Instructions box

Connect: Guest Services: Shampoo & Conditioner

Text is entered into the Guest Name box

Connect: Guest Services: Shampoo & Conditioner

After pressing done on the previous page, users are brought to this page to enter their name, Room number, and Checkout date.

Connect: Guest Services: Shampoo & Conditioner

Entering the checkout date. It defaults to the current date.

Connect: Guest Services: Shampoo & Conditioner

Entering the Room number

Connect: Guest Services: Shampoo & Conditioner

After entering the information, users press the Done button at the top right. The app then processes the entered information and sends it to Connect Staff.

Connect: Guest Services: Shampoo & Conditioner

Changing the Checkout date

Connect: Guest Services: Towels

Guests are given the option to enter details about their towel request. They are then brought to the page where they enter their name, room number, and check-out date. (see images 7G-7L)

Connect: Guest Services

An additional example of Requests Pressing the Towels button

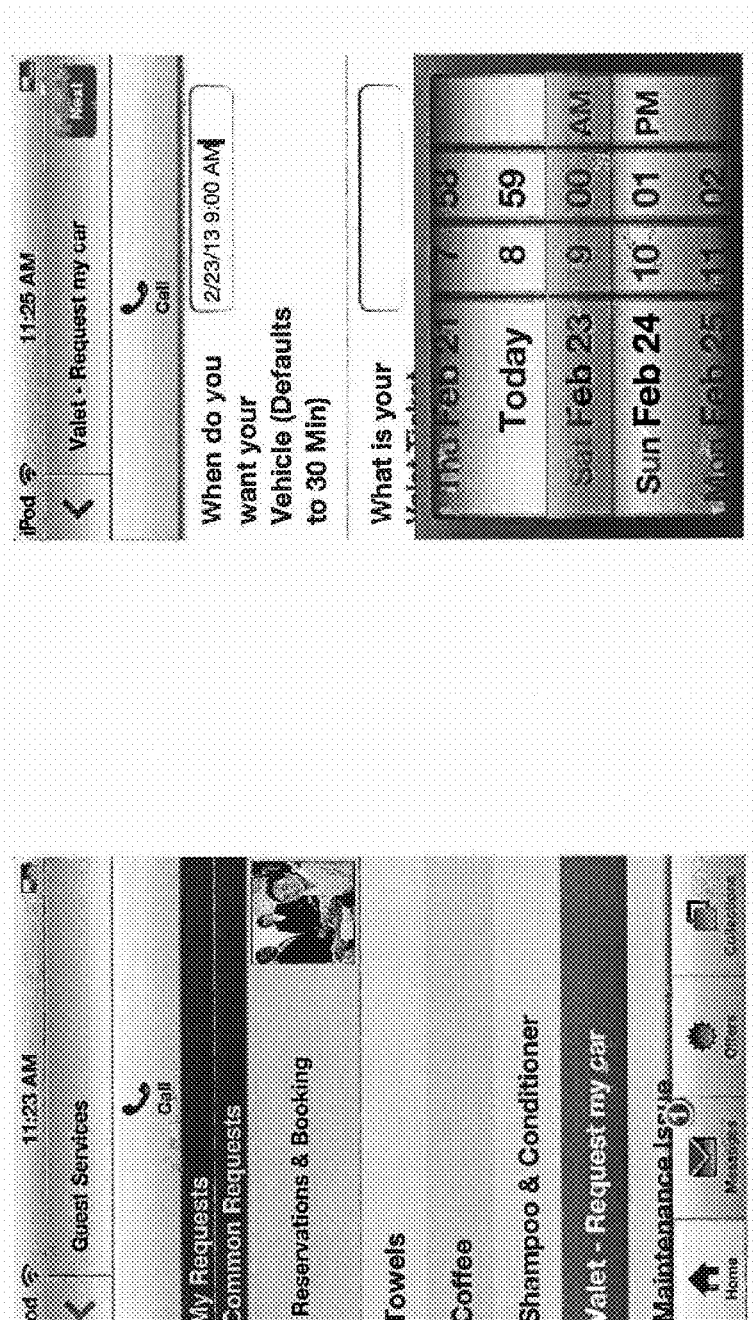

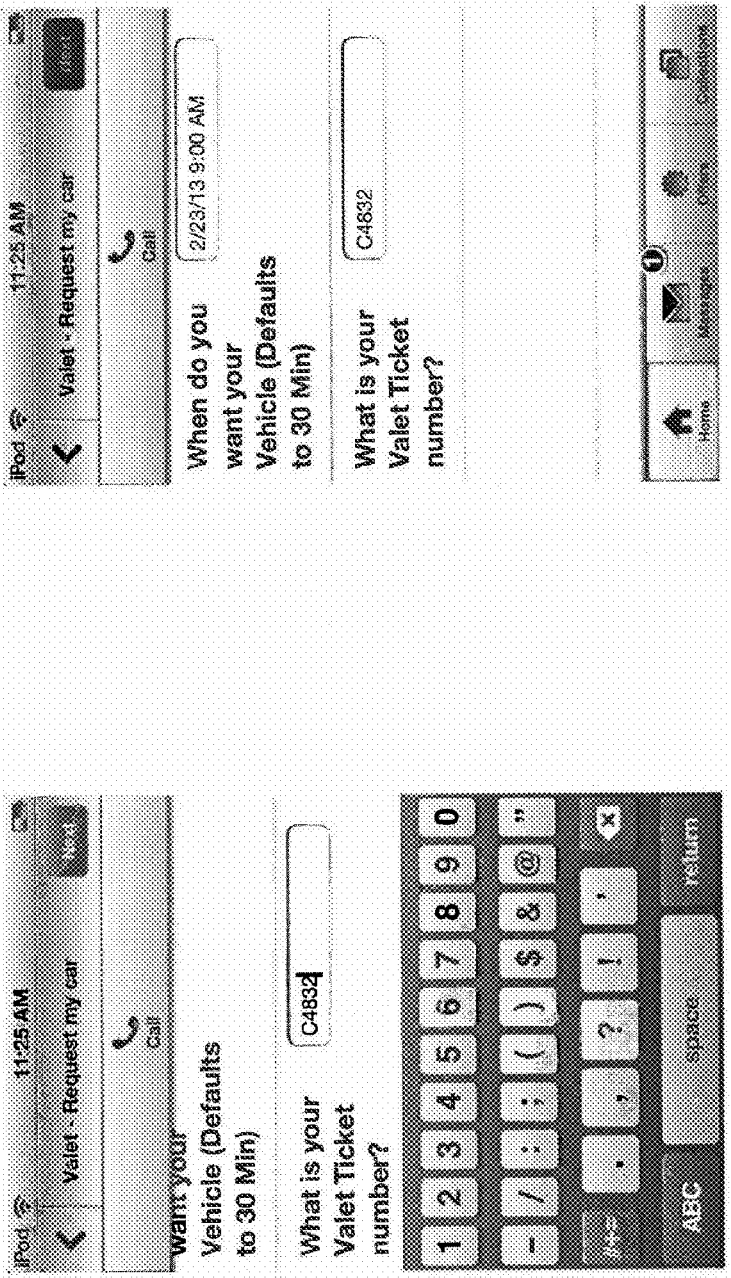

Connect Staff: Home Page

To see the Requests page, staff can click on either the main Requests button on the home page (seen here) or the Requests button at the bottom.

FIG. 10B

Connect Staff: Home Page

The Connect Staff Home Page resembles the guest-facing Connect Home Page. Instead of a Messages button at the bottom, there is a Requests button.

FIG. 10A

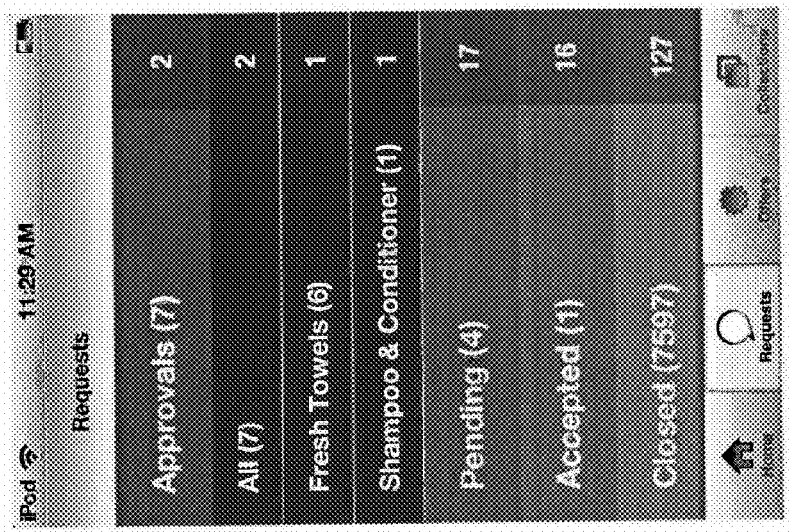

Connect Staff: Home Page

The Approvals category is broken down by request type.

FIG. 10D

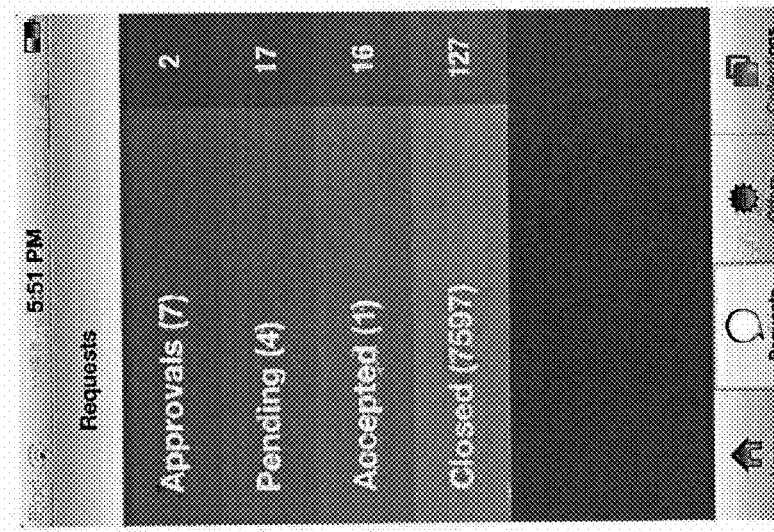

Connect Staff: Requests

On the Requests page, staff can see requests by category: Approvals, Pending, Accepted, and Closed. Each category then breaks down by request type.

The numbers in parentheses represent the number of requests that have not been viewed in that category. The number on the right represents the total requests in that category that have been viewed.

FIG. 10C

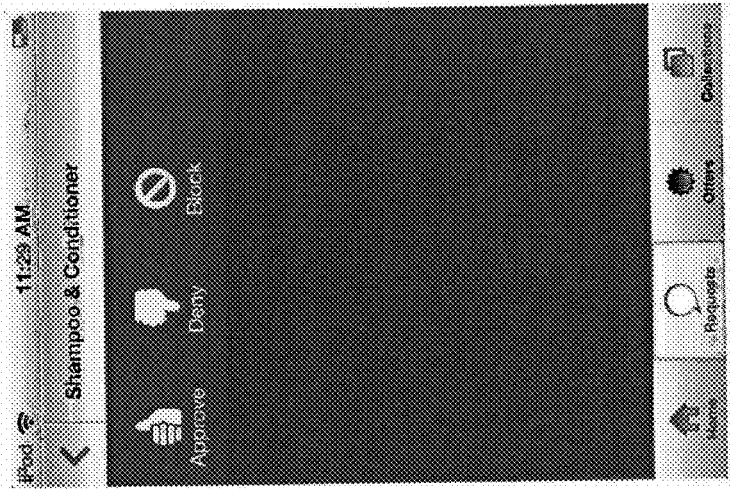

Connect Staff: Requests: Approvals: Shampoo & Conditioner

If guests slide the request to the right, they are given these options: Approve, Deny, and Block. Approval will send the request to the approvals list for further management. Denying or Blocking the request will take the request off.

FIG. 10F

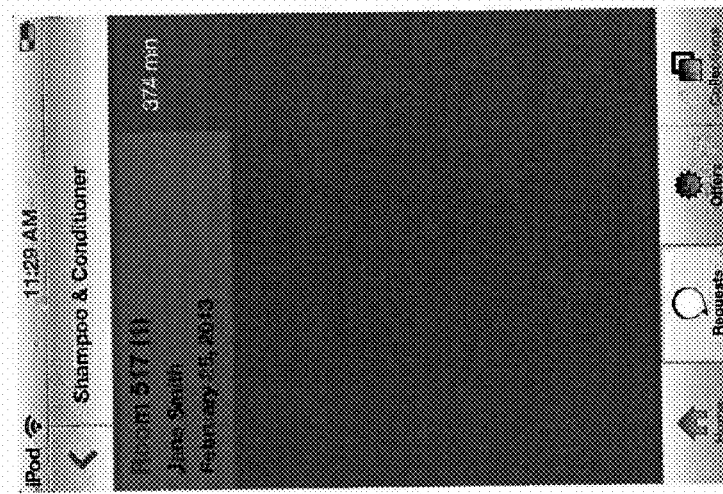

Connect Staff: Requests: Approvals: Shampoo & Conditioner

After choosing the desired request type, staff can choose which request to manage.

To interact with the request, staff can slide the request to the right to see options (see Image 27).

They can also click on the request to interact with it (see Image 28).

FIG. 10E

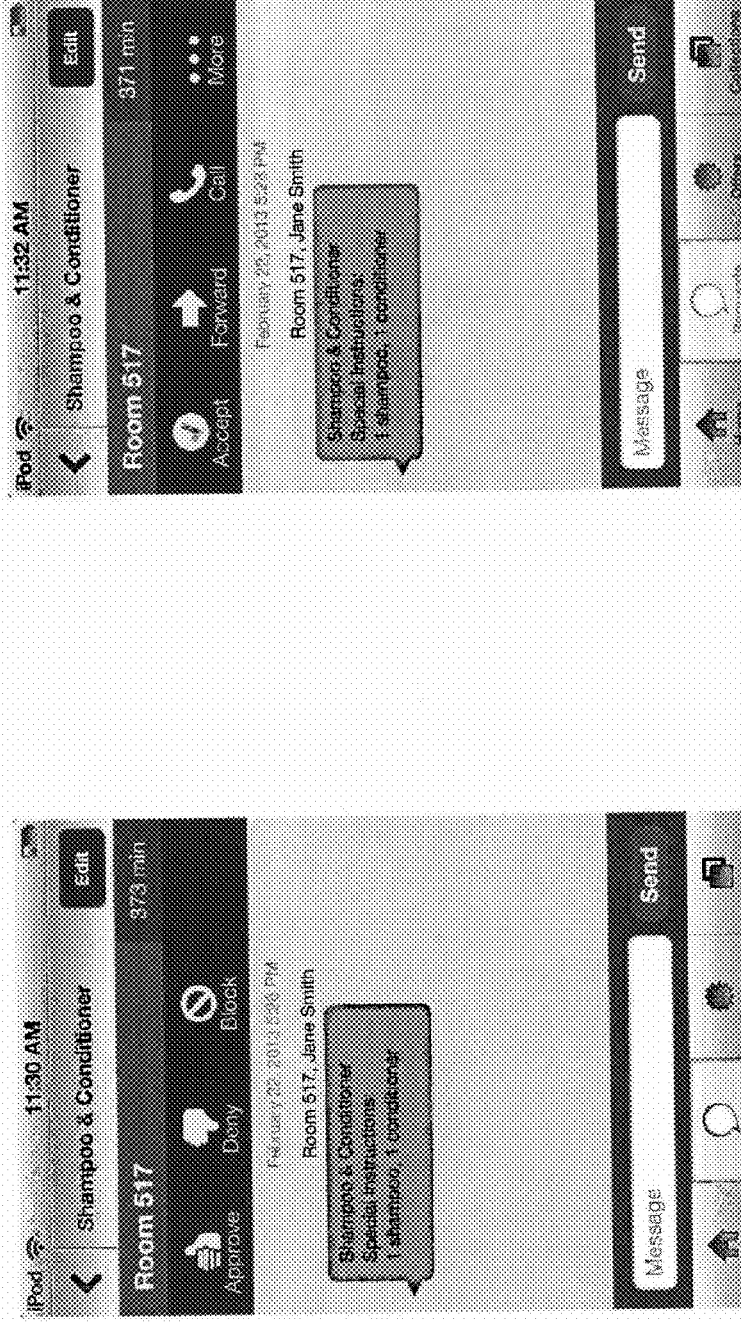

Connect: Guest Services: My Requests

Guests can see messages relating to their request as it happens. They can also send messages.

Connect: Guest Services

Guests see their request status in Connect after it is made. They can click on it to see messages relating to the request.

Connect Staff: Requests: Pending: Shampoo & Conditioner: Room 517

ETA options are in 5 minute intervals. Staff scroll through the options, then click Done.

Connect Staff: Requests: Pending: Shampoo & Conditioner: Room 517

Clicking Edit at the top right gives staff the option to set an ETA for completing the guest request.

Connect: Guest Services: My Requests

Guests see the status of their request as updates are made. They have the option to have a pop-up notification each time the request has an update.

FIG. 10N

Connect Staff: Requests: Pending: Shampoo & Conditioner: Room 517

After the ETA is changed, a message is sent notifying the guest.

FIG. 10M

Connect Staff: Requests: Pending: Shampoo & Conditioner

After clicking on the specific request type, in this case Shampoo & Conditioner, staff are brought to the pending requests for that type.

FIG. 10P

Connect Staff: Requests

After the request is approved, it is found in the Pending requests list.

FIG. 10O

Connect Staff: Requests: Pending: Shampoo & Conditioner

Staff can slide a specific request to the right to view options: Accept, Forward, or Follow.

Connect Staff: Requests: Pending: Shampoo & Conditioner

If a staff member accepts the request, it will turn green, the Accepted Request color, and the guest will get a notification of the accepted request (seen at the top).

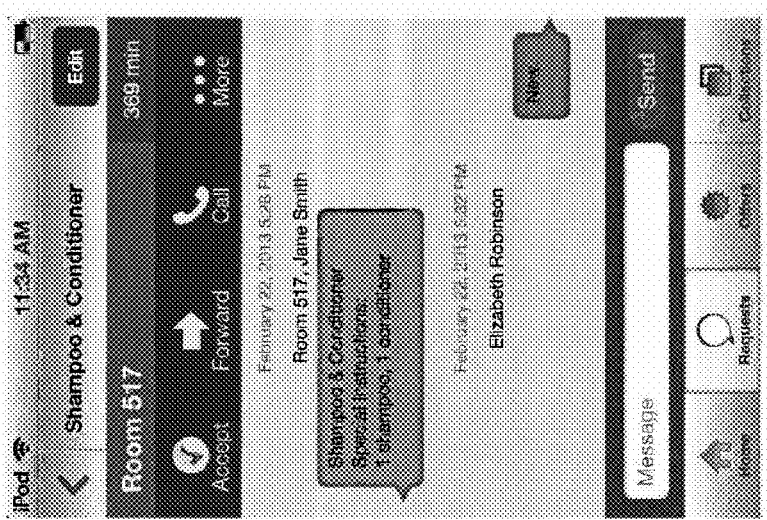

Connect Staff: Requests: Pending: Shampoo & Conditioner: Room 517

After a staff member clicks on a request, they are brought to this screen where they can message with the guest or choose the options above the message box.

FIG. 10T

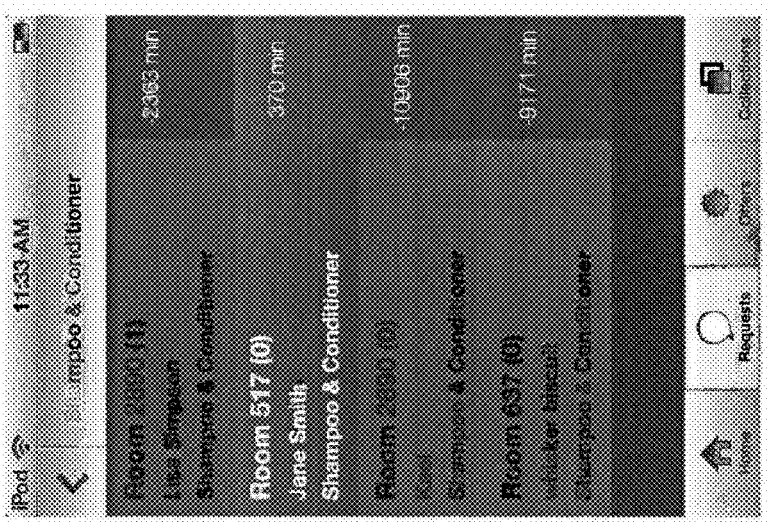

Connect Staff: Requests: Pending: Shampoo & Conditioner

If Staff don't slide the request to the right to see the options in Image 37, they can click on it to see messages and options.

FIG. 10S

Connect Staff: Requests: Pending: Shampoo & Conditioner: Room 517: Forward

In this case, we will forward the request to the Front Desk to take care of the Shampoo and Conditioner request.

Connect Staff: Requests: Pending: Shampoo & Conditioner: Room 517: Forward

Staff have the option to forward a request to a certain group.

Connect: Guest Services: My Requests

The guest can see that the request was forwarded.

Connect Staff: Requests: Pending: Shampoo & Conditioner: Room 517

After a request is forwarded, a message is sent notifying all staff and the guest that it was forwarded.

Connect Staff: Requests

After a request is Accepted, it is found in the Accepted Requests list.

Connect Staff: Requests: Pending: Shampoo & Conditioner: Room 517: Message

If a staff member wants to send a message to the guest, they click in the Message box, and the keyboard pops up.

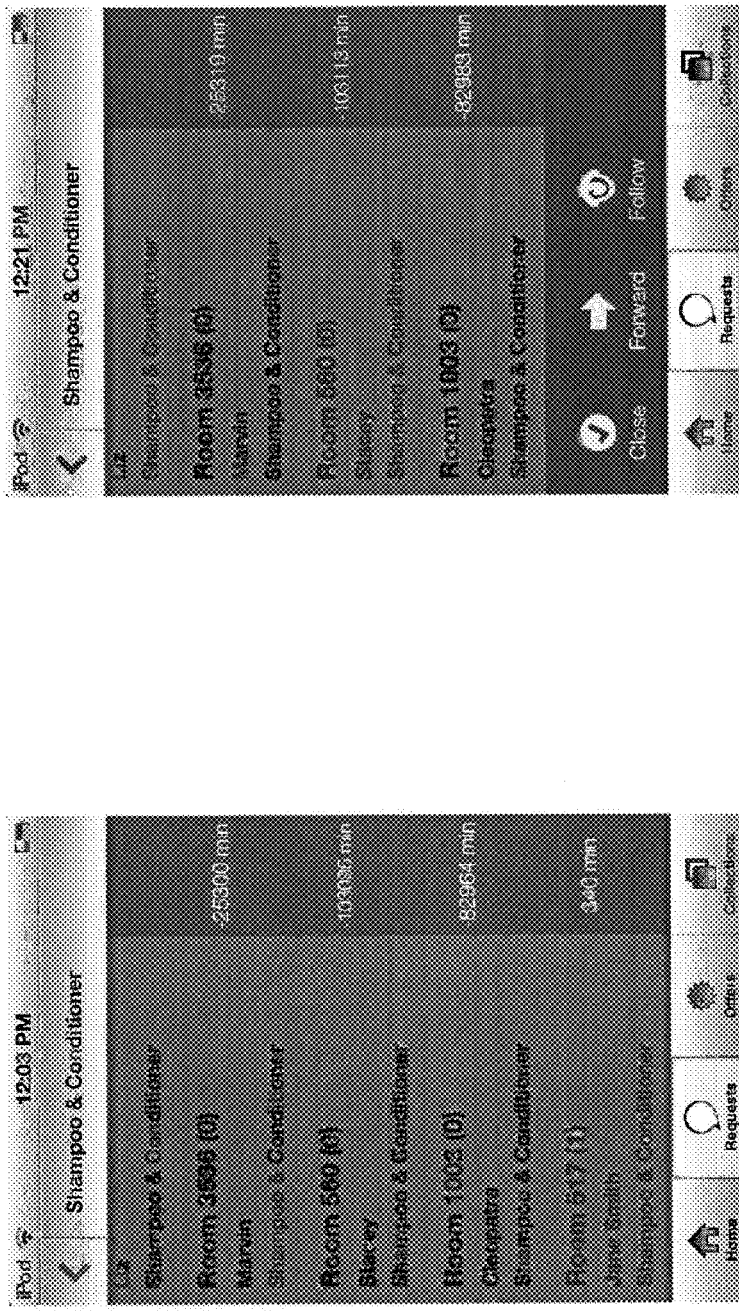

Connect Staff: Requests: Accepted: Shampoo & Conditioner

This is what it looks like when a staff member slides the request to the right. Here, they can close, forward, or follow the request.

FIG. 10BB

Connect Staff: Requests: Accepted: Shampoo & Conditioner

The Accepted Requests list. In the same manner as all the other stages, staff can slide a specific request to the right to see options, or they can click on it to see the messages and options.

FIG. 10AA

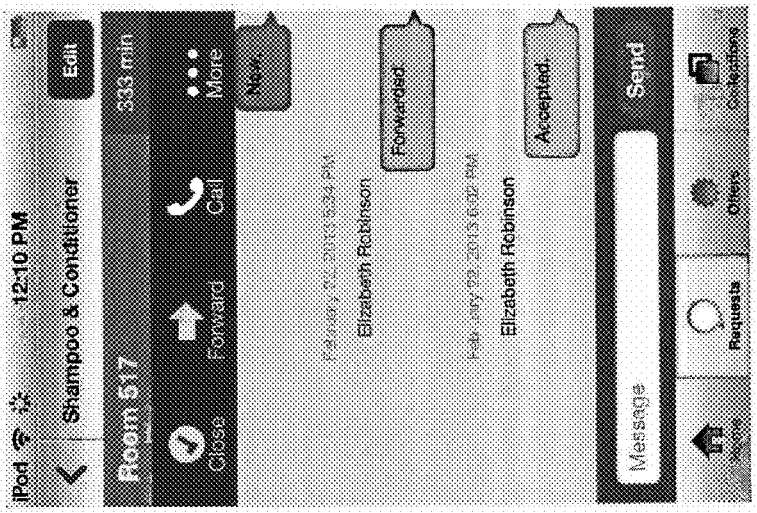

Connect Staff: Requests: Accepted: Shampoo & Conditioner: Room 517

When staff click on the request, they are brought to this screen. Like the others, they can send a message or choose from the options at the top: Close, Forward, Call, and more.

FIG. 10DD

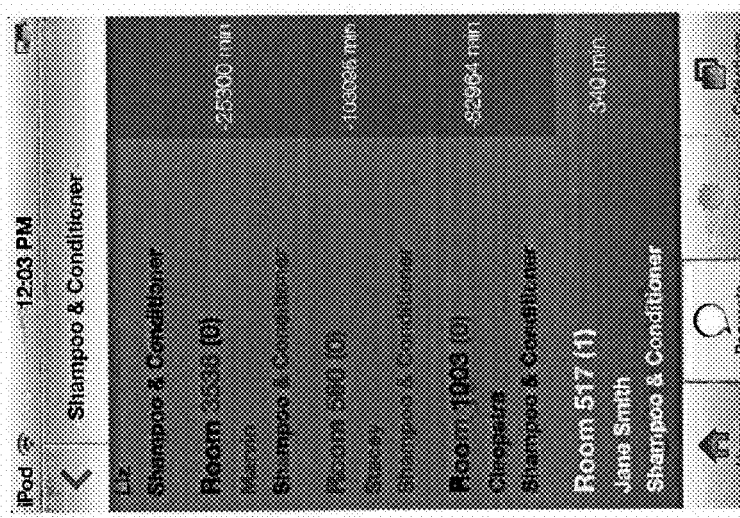

Connect Staff: Requests: Accepted: Shampoo & Conditioner

If guests would rather click on the request (seen here), it will bring them to the screen seen in Image 50.

FIG. 10CC

Connect: Guest Services: My Requests

The guest can see a message letting them know that the request was accepted.

Connect: Guest Services

Guests see in Connect that their request has changed to green, meaning it has been accepted.

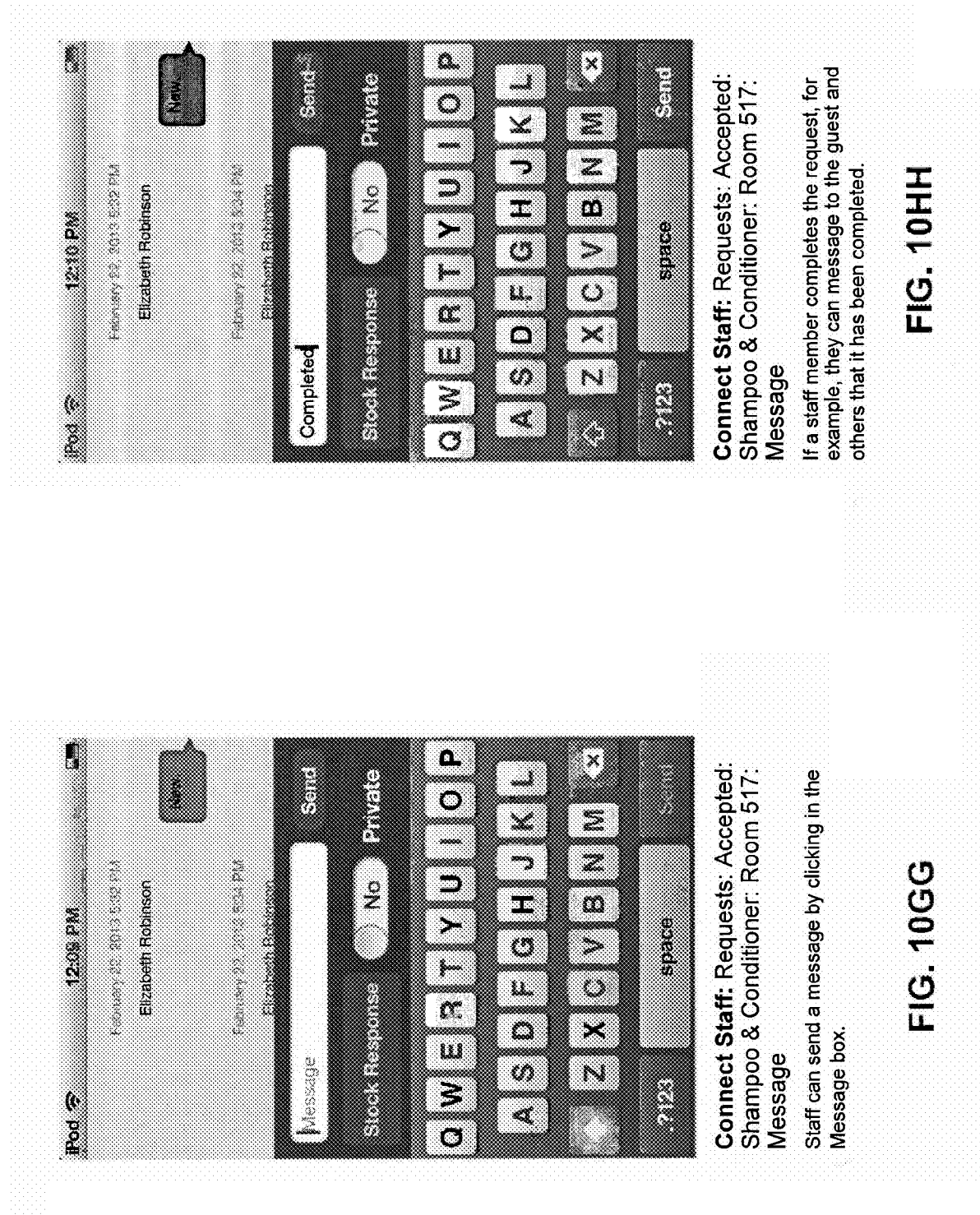

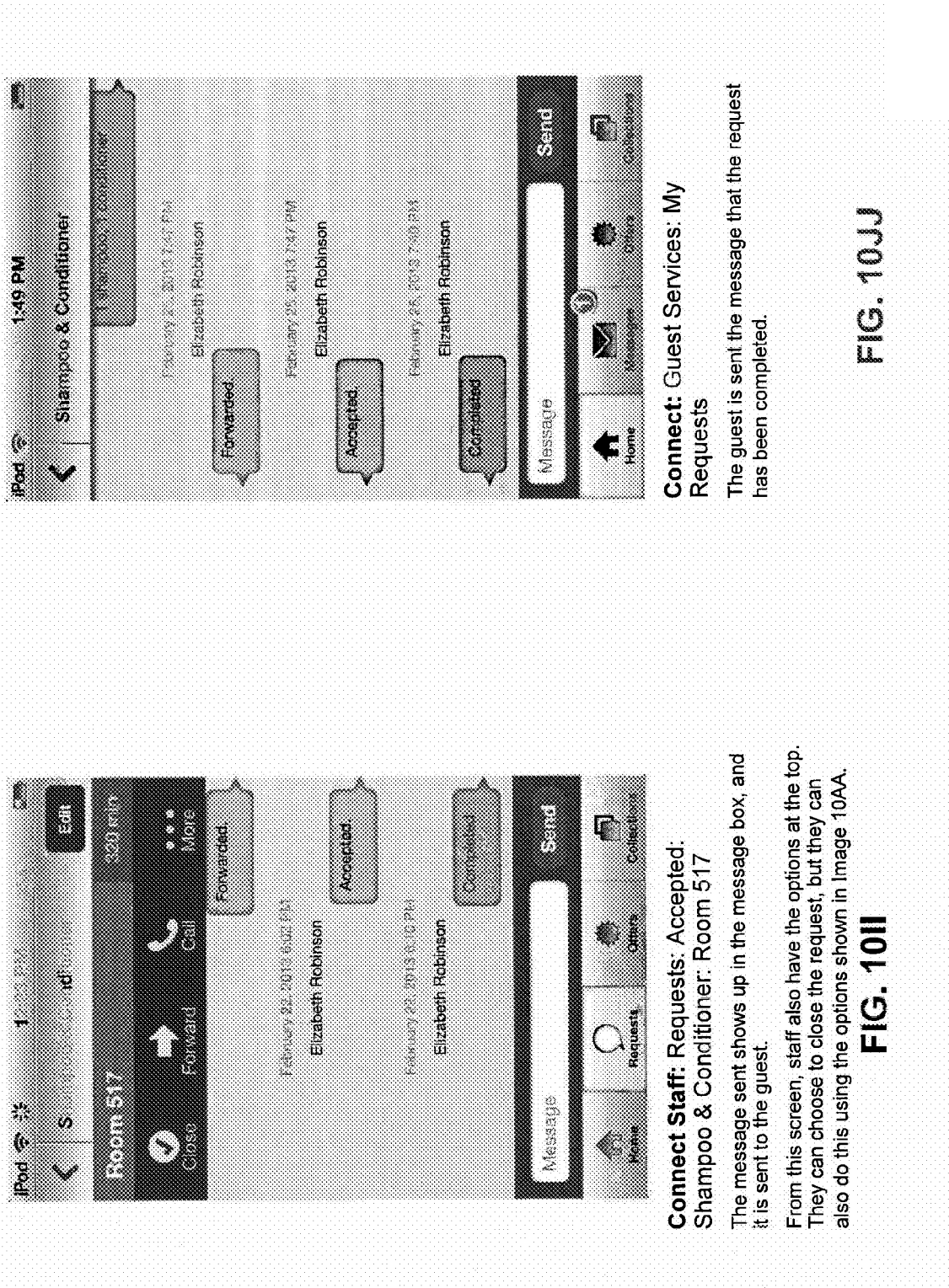

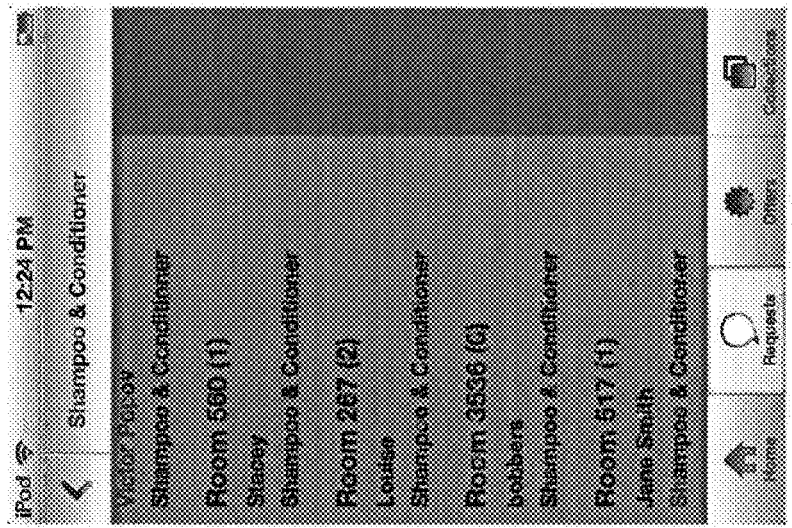

Connect Staff: Requests: Closed: Shampoo & Conditioner

Staff can look at the closed requests by category. They can move the list up and down by touching and moving it in the direction they want.

When staff click on the request, they are brought to the message screen shown in Image 10MM.

FIG. 10LL

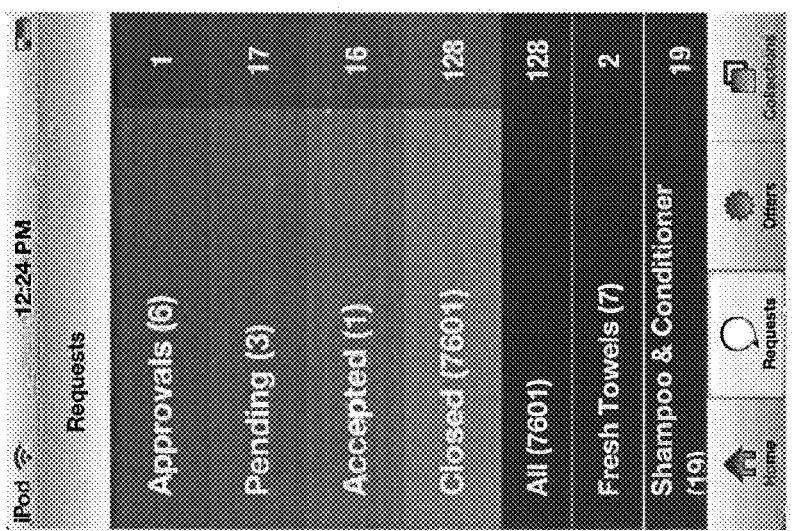

Connect Staff: Requests

Once the request has been closed either using the options found in Image 48 or Image 55, it will be found in the Closed list.

FIG. 10KK

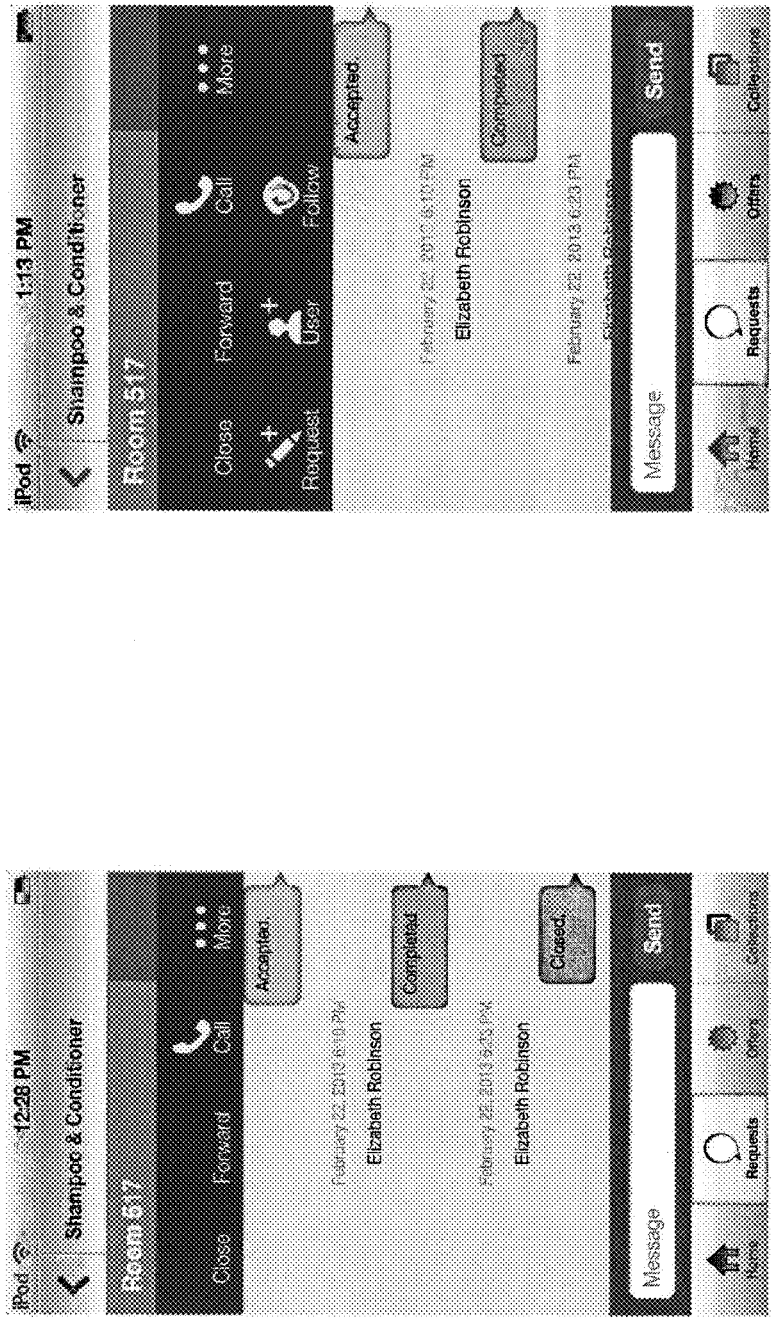

Connect: Guest Services: My Requests

When the guest clicks on the request, they can see a message that it is closed along with all the steps before its completion.

Connect: Guest Services

After the request is closed, guests will see the color changed to blue.

Connect Staff: Alert

When a request has not been acted upon in a timely manner, triggering actions (reassignment, e-mail alerts, automatic replies) will notify staff.

Connect Staff: Alert

The Alert, pressed.

RECEIVING AND QUEUING REQUESTS FROM HOSPITALITY CUSTOMERS

BACKGROUND

Hotels and hospitality vendors may offer goods, services, and recommendations to their customers. Hotels and hospitality vendors may employ staff dedicated to concierge services and/or develop extensive customer service operations. However, making goods, services, and recommendations known to customers has proved challenging. Moreover, offers may change frequently. As a result, customers are not able to interact with current information about offers or make requests to those who are in a position to fulfill them. Staff also face difficulty identifying and fulfilling customer requests.

BRIEF SUMMARY

Embodiments described herein include various method, system, and computer program product embodiments, and combinations and sub-combinations thereof, for receiving requests using a request management system. In an example embodiment, receiving requests using a request management system includes establishing a connection with a customer's mobile device, obtaining information about the location of the customer's mobile device, providing to the customer's mobile device a set of data describing goods and/or services currently offered by one or more business locations, receiving from the customer's mobile device a request for a good and/or service offered by a particular business location, and adding the request to a queue associated with one or more groups assigned to fulfill the request based on the request type.

Further embodiments are described in the accompanying description below.

BRIEF DESCRIPTION OF THE DRAWINGS

The accompanying drawings are incorporated herein and form a part of the specification.

FIG. 2D is a block diagram of an example interface for a staff user to handle a request from a staff user's mobile device, according to an example embodiment

FIG. 4A is a flowchart illustrating a process for adding a request to a request queue, according to an example embodiment.

FIG. 4C is a flowchart illustrating in further detail an example of processing queued requests according to one or more handle request selections made by a staff user, according to an example embodiment.

FIGS. 6A-6B, 7A-7L, 8A-8B, 9A-9D, 10A-10Z, and 10AA-10PP show further examples of interfaces relating to queuing requests from a customer or handling the requests so that staff users may fulfill the requests.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for receiving, queuing, tracking and processing customer requests using a request management system.

By way of non-limiting example, and not of limitation, the terms "customer" and "consumer" and any plural forms thereof may be used interchangeably to refer to natural persons as well as corporate or commercial customers, such as, for example, a business. Customers may include a guest of a hotel, hospitality vendor, and/or business.

The terms "business," "service provider," "commercial outlet," "merchant," and "vendor" may be used interchangeably to mean any person, entity, distribution system, software and/or hardware provider, broker and/or any other entity in the distribution chain of goods and/or services, commercial or otherwise. By way of example, not of limitation, a business may be a hotel, restaurant, retail establishment, airline, automobile dealership, travel agency, organization (e.g., non-profit), on-line merchant, and/or other business. While a hotel and/or a hospitality vendor are frequently referred to throughout herein, one having skill in the relevant art(s) would understand that other industries and businesses are contemplated.

By way of example, not of limitation, a customer may communicate and interact with a business in person, telephonically, and/or electronically, such as, for example, by using a computer connected to the Internet, a mobile device connected to the Internet, a local or wide area network, a telecommunications network, or any combination thereof. Communication and interaction may occur synchronously or asynchronously. A business may offer goods and/or services using one or more forms of interaction. A business may offer a customer the option of paying for goods and/or services using transaction accounts such as, for example, those associated with a credit line, debit account, loyalty program, and/or other form of financial processing method known or later developed.

TABLE OF CONTENTS

| | |
|---|---|
| A. Request Management System Architecture | 4 |
| B. Receiving Requests from a Customer Mobile Device | 13 |
| C. Queuing Requests from a Customer Mobile Device | 18 |
| D. Handling Requests from a Staff User Mobile Device | 23 |
| E. Alert Generation | 27 |
| F. Providing a Customizable Brand Display on a Customer Mobile Device | 28 |
| G. Example Interfaces for Queuing and Processing Requests from a Customer | 29 |
| H. Example Data Flow for Queuing and Processing Requests from a Customer | 36 |
| I. Example Computer System | 37 |
| J. Conclusion | 40 |

(a) Request Management System Architecture

Figure 1A:
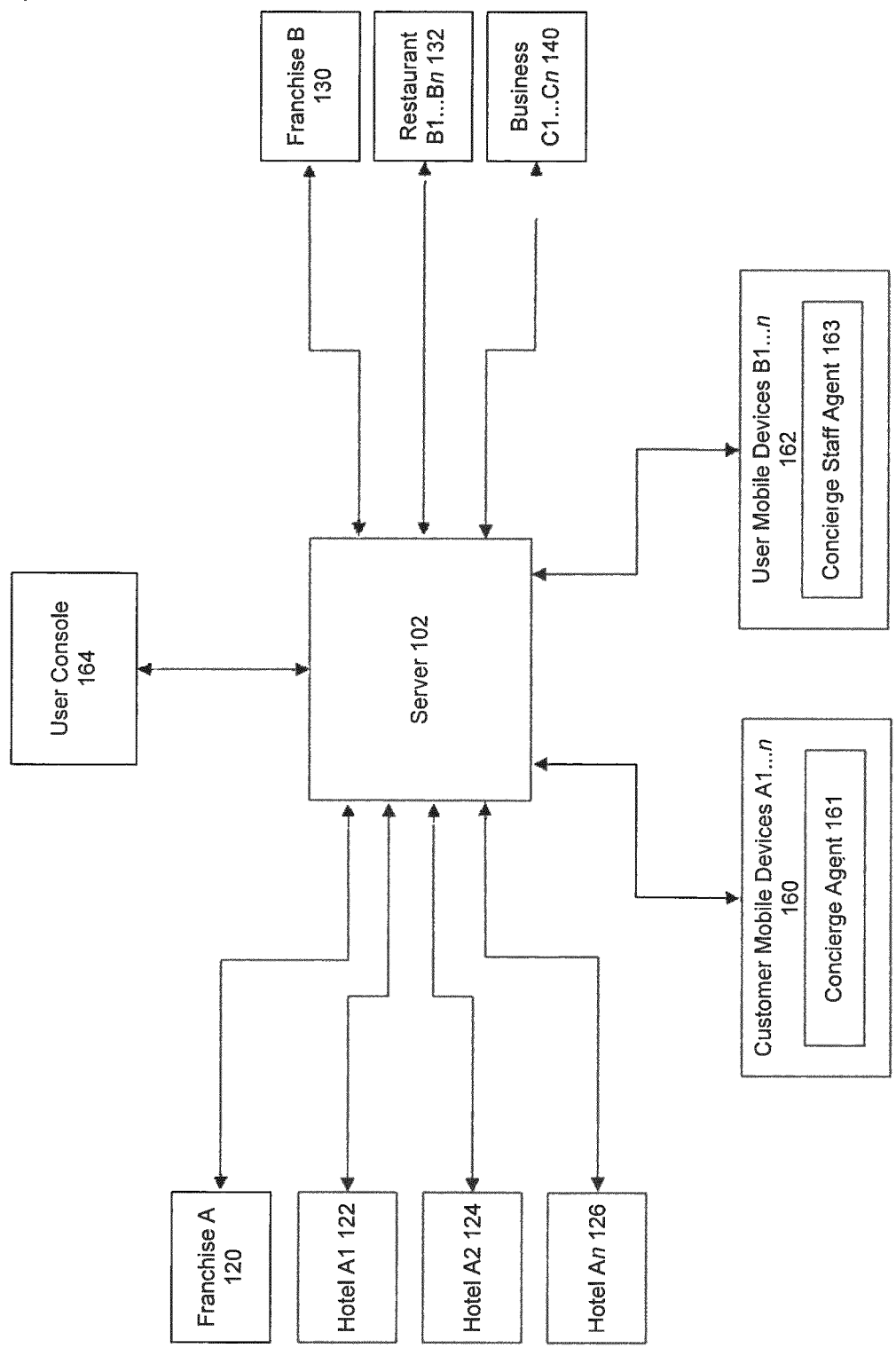
FIG. 1A is a block diagram of a server and clients, according to an example embodiment.

FIG. 1A shows an example system architecture 100 for establishing a connection between one or more business entities and one or more customer mobile phone devices. In an example embodiment, a business entity includes a franchise A 120. Franchise A 120 may be comprised of one or more hotels, such as, for example, hotel A1 122, hotel A2 124, and hotel An 126. Hotel A1 122, hotel A2 124 and hotel An 126 represent particular hotel locations which are, for example, part of a chain and/or commonly branded series of establishments associated with one or more franchises A 120. Franchise A 120 may be a brand or a sub-brand of a brand, and so on. Hotel A1 122, hotel A2 124 and hotel An 126 may be commonly branded to associate particular hotel locations with franchise A 120.

In an example embodiment, franchise B 130 is a business entity. Franchise B may be comprised of one or more, for example, restaurants B1 . . . Bn 132. Restaurants B1 . . . Bn 132 may represent particular restaurant locations which are, for example, part of a chain and/or commonly branded series of establishments associated with one or more franchises B 130. Franchise B 130 may be a brand or a sub-brand of a brand, and so on. Restaurants B1 . . . Bn 132 may be commonly branded to associate particular restaurant locations with franchise B 130. One having skill in the relevant art(s) would appreciate that restaurants B1 . . . Bn 132 may include, but are not limited to, entities involved in food vending, food preparation, food service, and/or hospitality industries such as, for example, fine dining establishments, fast food restaurants, family style restaurants, diners, rest stops, caterers, bars, grills, lounges, food delivery services, and/or other businesses which offer food.

In an example embodiment, businesses C1 . . . Cn 140 may represent one or more businesses offering goods and/or services to customers related to, for example, hospitality and/or local attractions, such as, for example, gift shops, book and music stores, apparel, accessories (e.g., jewelry, handbags, shoes), department stores, shopping malls, florists, grocery stores, tobacco, alcohol, cleaners, banks, sporting goods, electronics, hardware stores, amusement parks, outdoor (e.g., animals, wildlife, zoos, parks), sports and leisure (e.g., golf, tennis), spectatorship (e.g., sports arenas), historical landmarks, museums, art and culture, music, performing arts, crafts, movies, shopping, beauty, fitness, nail care, hair salons, barbers, spas, yoga studios, tanning, candy shops, toy stores, nightclubs, bars, lounges, casinos, pool halls, dancehalls, wine bars, microbreweries, distilleries, rental cars, airport transportation services, automotive services, taxis, trains, shuttles, insurance, pharmacies, printing and shipping, colleges, libraries, and/or religious institutions. One having skill in the relevant art(s) will appreciate that businesses C1 . . . Cn 140 may involve other categories of goods and services not listed above and need not be tied to hospitality.

In an example embodiment, one or more businesses C1 . . . Cn 140 have business relationships with franchise A 120 and/or one or more of hotel A1 122, hotel A2 124 and hotel An 126. Relationships may include agreements to promote goods or services offered by businesses C1 . . . Cn 140 to hotel customers. Such relationships may be established at the level of franchise A 120 and/or at the level of individual hotel A1 122, hotel A2 124 and/or hotel An 126. In an example embodiment, a recommendation network comprises a collection of relationships between businesses C1 . . . Cn 140, franchise B 130, restaurants B1 . . . Bn 132, franchise A 120, hotel A1 122, hotel A2 124 and/or hotel An 126. Such a recommendation network may be used to connect customers with promotions and offers based on, for example, location, behavior, and/or cross-promotional agreements.

In an example embodiment, a server 102 stores and processes information related to one or more of franchise A 120, hotel A1 122, hotel A2 124 hotel An 126, franchise B 130, restaurants B1 . . . Bn 132, and/or businesses C1 . . . Cn 140, collectively referred to as users. Users of server 102 may have partnerships, associations, and/or relationships with each other. Users of server 102 may operate independently of each other, in competition with each other, and/or according to commercial agreements.

In an example embodiment, one or more customers are connected to server 102 by customer mobile devices A1 . . . n 160. Customer mobile devices A1 . . . n 160 may include mobile computing devices (e.g., smart phones, mobile phones, personal digital assistants, tablets, electronic readers). Customer mobile devices A1 . . . n 160 are configured to send information to and receive information from server 102. Customer mobile devices A1 . . . n 160 may include operating systems operable to download and install one or more mobile applications such as, for example, a mobile application downloaded from an application store. Such applications may be configured to display data stored and/or processed on server 102. A display of information may be dynamic or static. Customer mobile devices A1 . . . n 160 may include a browser. A browser is operable to render web pages and/or to support operation of web applications. Data sent to and received from customer mobile devices A1 . . . n 160 may be displayed using a native application and/or a web application. Customer mobile devices A1 . . . n 160 may be identified by server 102 by a unique serial number, phone number, and/or a mobile identification number (MIN).

In an embodiment, customer mobile devices A1 . . . n 160 each include a concierge agent 161. In one example not intended to be limiting, concierge agent 161 is a mobile application that can operate as described herein to communicate with server 102 and provide one or more displays to a customer. These displays display data sent from server 102 and can include interfaces where a user can make selections and input data for sending to server 102. In this way, according to a feature, a variety of concierge and hospitality services can be provided to serve a customer through concierge agent 161.

In an example embodiment, one or more users are connected to server 102 by user mobile devices B1 . . . n 162. User mobile devices B1 . . . n 162 may be issued to staff of one or more of franchise A 120, hotel A1 122, hotel A2 124 hotel An 126, franchise B 130, restaurants B1 . . . Bn 132, and/or businesses C1 . . . Cn 140. For example, hotels may issue, distribute, or otherwise provide mobile devices to managers, staff members, and/or other employees. User mobile devices B1 . . . n 162 may include mobile computing devices (e.g., smart phones, mobile phones, personal digital assistants, tablets, electronic readers). User mobile devices B1 . . . n 162 are configured to send information to and receive information from server 102. User mobile devices B1 . . . n 162 may include operating systems operable to download and install mobile applications, such as, for example, a mobile application downloaded from an application store. Such applications are configured to display data stored and processed on server 102. Display of information on user mobile devices B1 . . . n 162 may be dynamic or static. User mobile devices B1 . . . n 162 may include a browser. A browser is operable to render web pages and/or support web applications, for example, on a mobile device. Data sent to and received from user mobile devices B1 . . . n 162 may be displayed using a native application and/or a web application. User mobile devices B1 . . . n 162 may be identified by server 102 using a unique serial number, phone number, and/or a mobile identification number (MIN).

In an embodiment, user mobile devices B1 . . . n 162 each include a concierge staff agent 163. In one example not intended to be limiting, concierge staff agent 163 is a mobile application that can operate as described herein to communicate with server 102 and provide one or more displays to a staff user of a business responsible for handling customer requests. These displays display data sent from server 102 and can include interfaces where a staff user can make selections and input data for sending to server 102. In this way, according to a feature, a staff user can fulfill requests relating to a variety of concierge and hospitality services through concierge agent 163 to serve customers.

In an example embodiment, server 102 is configured to allow interaction with one or more users authorized to offer goods and/or services to customers. For example, one or more employees responsible for designing promotions may be authorized to create and/or release offers for redemption and/or fulfillment. Design and release of offers is facilitated by providing access to a user console 164. User console 164 may provide access to data stored on server 102. In an example embodiment, user console 164 receives inputs from authorized users. Users may be authenticated by verifying a username and password. One having skill in the relevant art(s) would appreciate that other forms of access control may be used. In an example embodiment, a marketing executive may be given authorization to set permissions for one or more employees to create, modify, and/or delete information associated with a user account for franchise A 120. An employee or group of employees may be tasked with creation and/or release of promotions designed and/or preformatted for distribution to customers. For example, an employee may be tasked with identifying and/or describing goods and/or services available and/or offered to customers. Offers may be displayed on customer mobile devices A1 . . . n 160.

In an example embodiment, to interact with server 102 and/or to provide input to user console 164, employees/staff may receive individual user accounts. User console 164 may serve as access control for server 102. Access control includes but is not limited to assigning role-based privileges, such as those defined by an executive or staff manager. Privileges may be associated with individual user accounts assigned to, for example, staff members. Privileges may reflect authorization to create, modify, and/or delete records and data on server 102. Privileges may thus be assigned based on a staff member's role and/or status. Individual staff members may be grouped and re-grouped based on other criteria.

In an example embodiment, user console 164 controls access to and modification of data stored on server 102. For example, authorized users may populate and/or release promotional templates, designs, and/or customizable made available by server 102. In an example embodiment, user console 164 comprises a web based portal accessible to users who provide valid login credentials such as, for example, a username and password. Such a portal may display user interface components such as, for example, viewers, navigation, controllers, form fields, buttons, drag-and-drop, design templates, and other components which may facilitate performance of marketing workflow.

In an example embodiment, user console 164 is a browser-based web application. In an example embodiment, user console 164 is a native application configured to launch and operate, for example, on a tablet and/or mobile phone. In an example embodiment, user console 164 is an executable file configured to launch and operate in an environment where inputs may be received and outputs displayed to a user with or without access to a network connection, for example, which is synchronized when a connection is available.

Figure 1B:
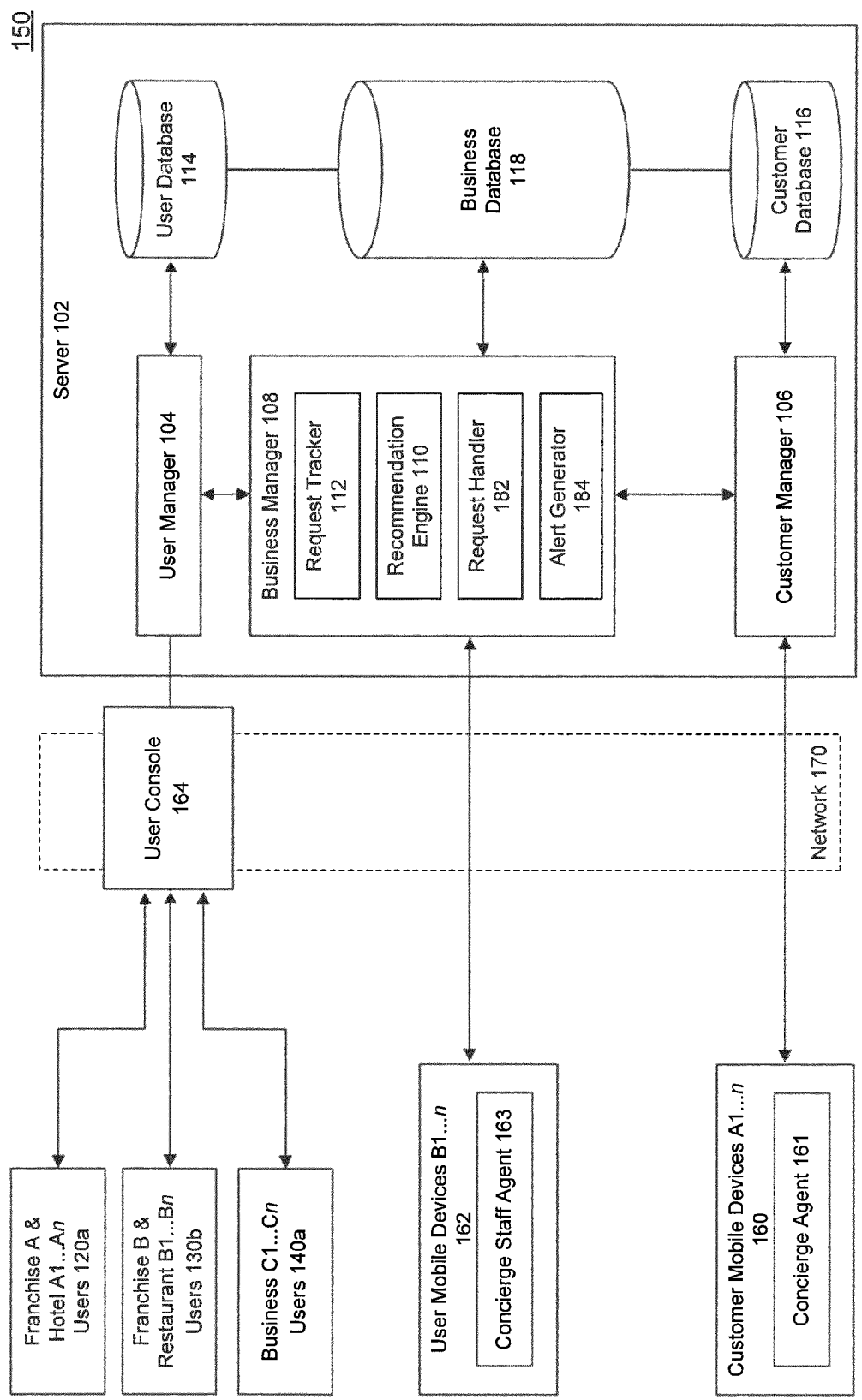
FIG. 1B is a block diagram of a request management system, according to an example embodiment.

FIG. 1B shows a request management system 150. Request management system 150 may include one or more clients connected to server 102 over a network 170. In an example embodiment, request management system 150 includes architecture distributed over one or more networks, such as, for example, a cloud computing architecture. Cloud computing includes but is not limited to distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), integration platform as a service (IPaaS), etc.

In an example embodiment, one or more clients connected to server 102 include franchise A and hotel A1 . . . An users 120a, franchise B and restaurant B1 . . . Bn users 130b, business C1 . . . Cn users 140a, customer mobile devices A1 . . . n 160, and/or user mobile devices B1 . . . n 162. Network 170 includes but is not limited to a local/wide area network, wireless local area network, telecommunications network, or any combination thereof.

In an example embodiment, server 102 includes a user manager 104 connected to a user database 114. Franchise A and hotel A1 . . . An users 120a, franchise B and restaurant B1 . . . Bn users 130b, and/or business C1 . . . Cn users 140a may connect with user manager 104 over network 170. User manager 104 may output requested data and/or push data to user console 164. In an example embodiment, user console 164 is accessible to franchise A and hotel A1 . . . An users 120a, franchise B and restaurant B1 . . . Bn users 130b, and/or business C1 . . . Cn users 140a and user manager 104 may receive, process, and/or manage input provided using user console 164. User inputs may be stored in user database 114.

In an example embodiment, user database 114 stores data such as, for example, user account information, access control privileges, preferences, settings, and/or payment processing information. For example, franchise A and hotel A1 . . . An users 120a establish one or more accounts for connecting with server 102. Such accounts may be linked to one or more methods of payment such as, for example, a credit line. Payments, fees, dues for membership, and/or other forms of compensation may thus be collected for use of request management system 150 and/or the recommendation network.

In an example embodiment, a business database 118 processes and/or warehouses data relating to businesses such as franchise A and hotel A1 . . . An users 120*a*, franchise B and restaurant B1 . . . Bn users 130*b*, and/or business C1 . . . Cn users 140*a*. Such information may include but is not limited to geolocation, offered goods and/or services, classification of goods and/or services, hours of operation, associations with other businesses on, for example, the recommendation network, logs of activity associated with customer mobile devices A1 . . . n 160, indications provided by customers recommending a business, and/or other indicia. One having skill in the relevant art(s) will appreciate that business database 118 and associated data structures may include other types of indicia, criteria, and metrics useful for indexing and warehousing information about one or more businesses.

In an example embodiment, server 102 includes a business manager 108. Business manager 108 is connected to business database 118. In an example embodiment, business manager 108 includes a recommendation engine 110 and a request tracker 112.

In an example embodiment, business manager 108 may connect with user mobile devices B1 . . . n 162. For example, franchise A and hotel A1 . . . An users 120*a*, franchise B and restaurant B1 . . . Bn users 130*b*, and/or business C1 . . . Cn users 140*a* may input, select, and/or define role-based configurations and privileges for user mobile devices B1 . . . n 162 by interacting with user console 164. Configurations and privileges may be translated, for example, by user manager 104, into rules to be implemented by business manager 108 in the course of facilitating communication with user mobile devices B1 . . . n 162.

In an example embodiment, business manager 108 is connected to user manager 104 and may receive data handled by user manager 104 such as, for example, associations between businesses on, for example, a recommendation network. Business manager 108 may be configured to store mappings of such associations in business database 118. User manager 104 may receive data handled by user manager 104 such as, for example, role-based configurations and privileges for user mobile devices B1 . . . n 162. For example, user manager 104 may generate a mapping of role-based configurations and privileges for business manager 108 which may, in turn, be translated into business rules and the like.

In an example embodiment, business manager 108 may include a recommendation engine 110. Recommendation engine 110 may receive data from customer mobile devices A1 . . . n 160 handled, for example, by a customer manager 106. Such data may include, for example, geolocation, natural language, and/or search criteria in the form of query. In an example embodiment, recommendation engine 110 processes input from customer mobile devices A1 . . . n 160. Input may include a specific request for a recommendation regarding particular goods and/or services (e.g., restaurants, dry cleaning). Recommendation engine 110 may also receive data without input from a customer. For example, recommendation engine 110 may receive contextual information from customer manager 106 such as, for example, location, a history associated with customer mobile devices A1 . . . n, information obtained from an account, and/or data accessible to a server connected to a mobile client.

In an example embodiment, recommendation engine 110 generates query syntax reflecting a decision tree of criteria and prioritization based on, for example, proximity of location, relevance to search terms input or deduced from context triggers, partnerships or promotional agreements, such as those reflected by association with the recommendation network, and/or prediction using one or more algorithms such as, for example, a Bayesian algorithm. Business database 118 returns results. Results returned by business database 118 are processed for display by recommendation engine 110 which may apply additional filtering and/or arrange the results so as to provide, for example, information rich listings. Listings may be further filtered, sorted, and/or arranged by customer manager 106 and/or on customer mobile devices A1 . . . n. Data structures output by recommendation engine 110 may be displayed by a native application or web application.

In an example embodiment, business manager 108 includes a request tracker 112. Request tracker 112 is connected to customer manager 106. Request tracker 112 may be configured to receive data and/or messages generated by concierge agents 161 at customer mobile devices A1 . . . n 160. Request tracker 112 is configured to receive requests received from customer mobile devices A1 . . . n 160 which may be processed by customer manager 106. Request tracker 112 is connected to user mobile devices B1 . . . n 162. Request tracker 112 is configured to receive data and/or messages generated by user mobile devices B1 . . . n 162. In an example embodiment, customer manager 106 and request tracker 112 manage a two-way line of communication between customer mobile devices A1 . . . n 160 and user mobile devices B1 . . . n 162. Customer manager 106 and request tracker 112 coordinate and facilitate such interaction. In a non-limiting example, customer mobile device A1 . . . n 160 having a concierge agent 161 generates a request, customer manager 106 authenticates customer mobile device A1 . . . n 160, request tracker 112 processes the request, and request tracker 112 queues the request based on the type and/or role-based or group settings specified by franchise A and hotel A1 . . . An Users 120*a*, franchise B and restaurant B1 . . . Bn users 130*b*, and/or business C1 . . . Cn users 140*a*.

In an embodiment, business manager 104 includes a request handler 182 and alert generator 184. Request handler 182 and alert generator 184 communicate with concierge staff agents 163 at user mobile devices B1 . . . n 162 and can access data on customer requests stored in business database 118. This can include access to requests queued by request tracker 112 based on the type and/or role-based or group settings specified by franchise A and hotel A1 . . . An users 120*a*, franchise B and restaurant B1 . . . Bn users 130*b*, and/or business C1 . . . Cn users 140*a*.

As described further below, request handler 182 communicates with a concierge staff agent 163 to enable a staff user to view one or more displays that allow the staff user of a business to fulfill customer requests. These displays display data are sent from server 102, and in particular request handler 182, and can include interfaces where a staff user can make selections and input data for sending to server 102, and in particular request handler 182. In this way, according to a feature, a staff user can fulfill requests relating to a variety of concierge and hospitality services through concierge agent 163 to serve customers. Similarly, as described below, alert generator 184 also communicates with a concierge staff agent 163 to notify a staff user of pending requests that have exceeded an alert criteria.

In an example embodiment, server 102 includes customer manager 106. Customer manager 106 is connected to a customer database 116. Customer mobile devices A1 . . . n 160 may connect to customer manager 106. Customer manager 106 may output requested information and/or push data to a native and/or web application operating on a customer mobile device A1 . . . n 160. Customer manager 106 may receive, process, and/or manage input provided by customer mobile devices A1 . . . n 160 operating concierge agents 161. Customer manager 106 may also collect data from customer mobile devices A1 . . . n 160 not provided as input such as, for example, geolocation and/or data accessible to a server connected to a mobile client. In an example embodiment, customer database 116 stores customer data such as, for example, a location provided by customers operating customer mobile devices A1 . . . n 160, a location sensed and/or received from a geolocating service accessible upon connecting with one or more customer mobile phone devices A1 . . . n 160, information provided by the customer in a survey and/or other form or inquiry, information not provided by the customer but known, accessible, or otherwise available, for example, based on a log or history.

In an example embodiment, customer manager 106 is connected to user manager 104 and business manager 108. User manager 104 accesses information about customers which may be stored in customer database 116. User manager 104 presents information to franchise A and hotel A1 . . . An users 120a, franchise B and restaurant B1 . . . Bn users 130b, and/or business C1 . . . Cn users 140a, for example, as a report displayed on user console 164. Business manager 108 may receive inputs from customer mobile devices A1 . . . n 160 transmitted by customer manager 106. In a non-limiting example, business manager 108 receives geolocation, natural language, and/or search criteria input by a customer into customer mobile phone devices A1 . . . n 160. The input may be processed and/or formatted by customer manager 106. For example, customer manager 106 may transform the input into query syntax and/or provide the input directly to business manager 108. For example, business manager 108 may run one or more queries against business database 118. In turn business database 118 may return results. Results returned by business database 118 may be processed for display by customer manager 106 and may be arranged so as to provide information rich listings to customer mobile devices A1 . . . n 160. Such information rich listings may include results filtered and sorted based on geolocation, a history associated with customer mobile devices A1 . . . n, relevance to search terms, prioritization of results based on associations or promotional agreements, and/or prediction using one or more algorithms such as, for example, a Bayesian algorithm. Data structures output by business manager 108 may be displayed by a native application or web application.

In an example embodiment, system components of server 102 may be coupled to and/or accessed by each other. For example, data from each database may be accessed by each manager on server 102. Furthermore, user database 114, business database 118, and customer database 116 may be linked or otherwise communicatively coupled to allow for searching and asset management across the broader architecture of request management system 150. Moreover, queries may be cached in readily accessible storage, for example, to provide optimization for routinely run queries. Caches may be localized throughout the architecture of request management system 150 based, for example, on available memory.

(b) Receiving Requests from a Customer Mobile Device

Figure 2A:
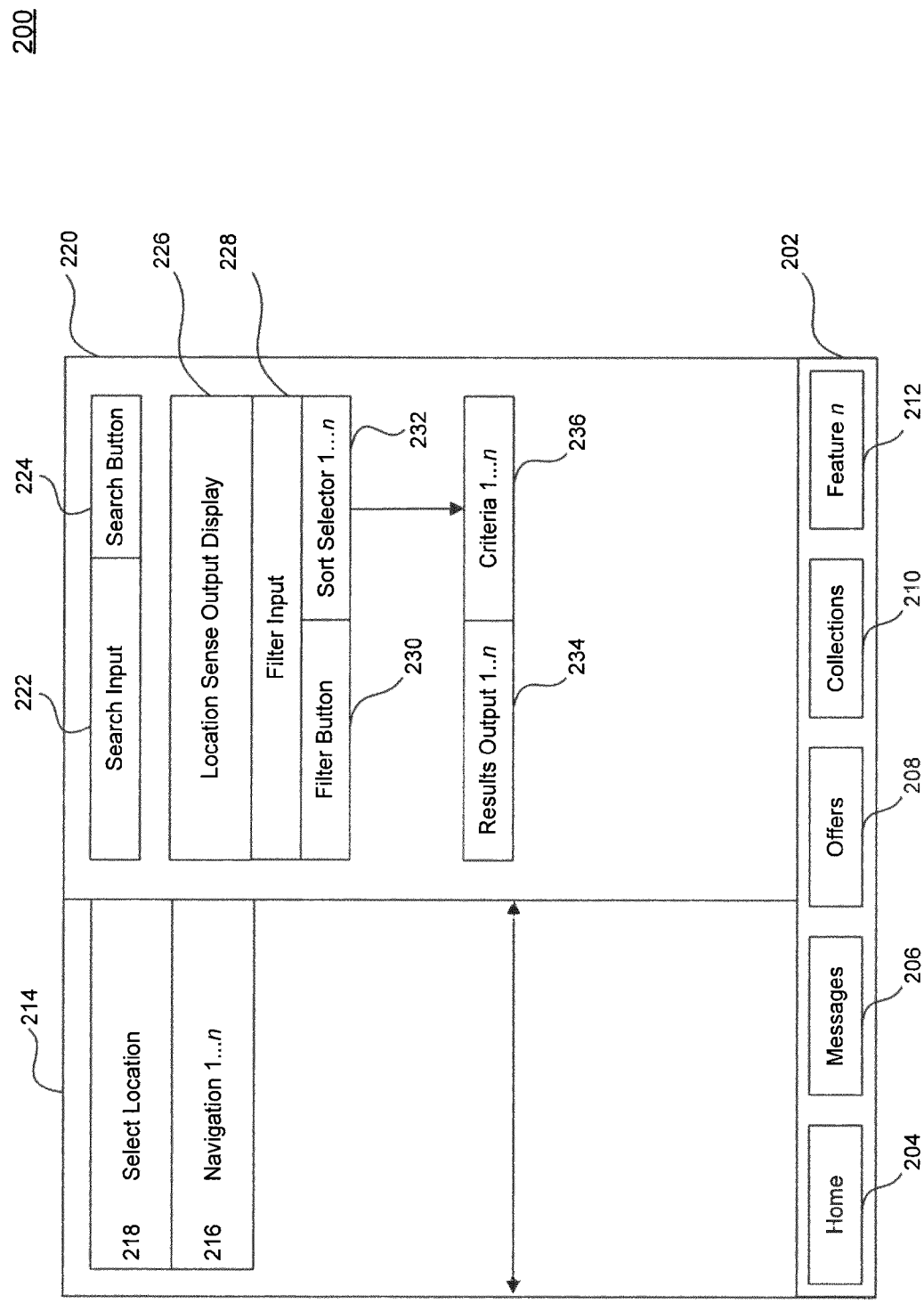
FIG. 2A is a block diagram of an example interface for receiving a selection from a customer's mobile device, according to an example embodiment.

FIG. 2A illustrates an example search interface 200 useful for receiving a location selection from customer mobile devices A1 . . . n 160. In an example embodiment, search interface 200 comprises a global navigation bar 202, a navigation pane 214, and a display area 220. Navigation pane 214 may be minimized, for example, to provide additional or enlarged screen space for display area 220. Global navigation bar 202 includes controllers for accessing one or more interfaces such as a home interface 204, a messages interface 206, an offers interface 208, a collections interface 210, and others represented by feature n 212. Navigation pane 214 may provide sub-navigation useful for accessing one or more interfaces such as, for example, a select location interface 218 and other navigation 1 . . . n 216. Global navigation bar 202 and navigation pane 214 may be displayed in whole or in part across different interfaces. Interfaces may be supported and displayed by a native application or web application operating on customer mobile devices A1 . . . n 160. An interface as used herein generally refers to a display area having one or more images or a display area having one or more images and/or one or more areas with a user-interface element or region that can be selected by a user. Interfaces may be branded or unbranded depending on a particular application or need.

In an example embodiment, customer mobile devices A1 . . . n 160 may view select location interface 218. Select location interface 218 includes a search input element 222 and a search button 224. Customer input of search terms, criteria, and/or natural language into search input element 222 and submission thereof, for example, by executing search button 224, in turn generates one or more requests to server 102.

In an example embodiment, select location interface 218 includes a location sense output display 226. Location sense output display 226 accesses geolocation information stored and/or requested from customer mobile devices A1 . . . n 160. Location sense output display 226 may display information regarding a customer's geolocation. Location sense output 226 may display a message requesting that the customer confirm the information displayed. A customer may confirm the information and/or input different parameters for determining geolocation such as, for example, a zip code, street address, city and/or state, coordinates, and other forms of geolocation such as, for example, landmarks recognizable by one or more geolocating services accessible to and/or provided by server 102.

In an example embodiment, submission of input in search interface 200 generates one or more requests to server 102. In an example embodiment, customer manager 106 receives a request based on search criteria. Customer manager 106 may store information regarding the request in customer database 116. Customer manager 106 may process the request and/or command business manager 108 to generate a query on business database 118. Such a query may return a listing of results based on the search criteria to business manager 108 and/or customer manager 106, either of which may further process and/or manipulate the results to produce information rich listings suitable for presentation on search interface 200. Results are displayed on search interface 200 as results output 1 . . . n 234. Results output 1 . . . n 234 may display corresponding indicia such as criteria 1 . . . n 236 useful for sorting, organizing, and/or arranging results output 1 . . . n 234. Once displayed on search interface 200, results output 1 . . . n 234 may be filtered by a customer using, for example, a filter input 228 to further restrict results output 1 . . . n 234, for example, based on key terms which may be submitted using filter button 230. A customer may sort results output 1 ... n 234 by one or more of criteria 1 ... n 236 by selecting one or more options of sort selector 1 ... n 232, where criteria 1 may correspond to sort selector 1, criteria 2 to sort selector 2, and so on. In a non-limiting example, a customer uses the search functionality to generate a list of nearby hotels and selects a particular hotel, for example, hotel A1 122. Hotel A1 122 may be located where the customer is standing. For example, when the customer is standing in the lobby of hotel A1 122, hotel A1 122 may appear at the top of the information rich listing because server 102 correctly identified the location of hotel A1 122 as the closest in proximity to the geolocation of a customer's mobile device. The customer may select location A1 122 or a different business location.

Figure 2B:
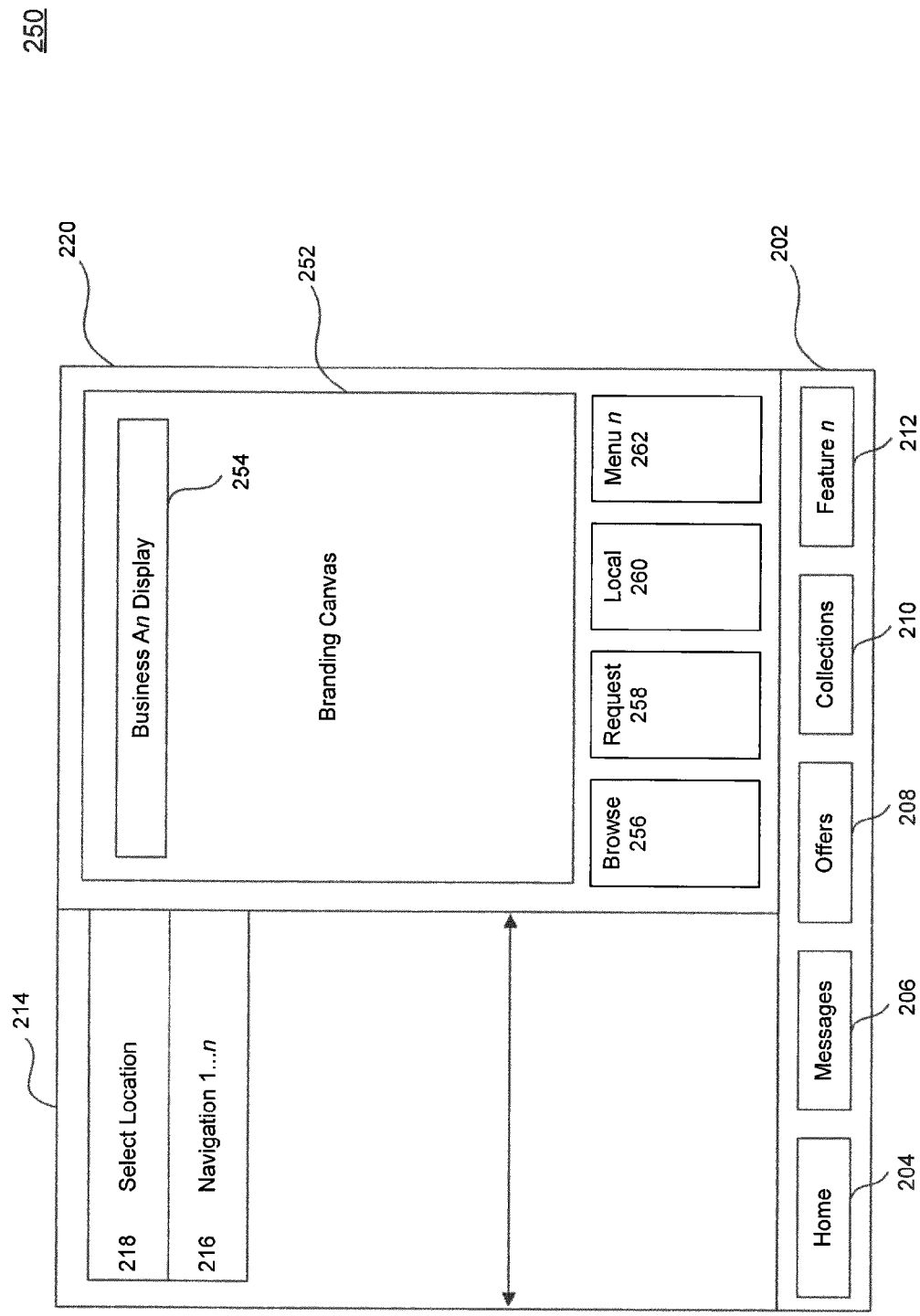
FIG. 2B is a block diagram of an example interface for providing a customizable brand display to a customer's mobile device, according to an example embodiment.

FIG. 2B illustrates an example branded interface 250 for providing a customizable brand display to a customer's mobile device A1 ... n 160. In an example embodiment, the display of branded interface 250 reflects the specifications provided by authorized users of user console 164. Such specifications may include logos, media, displays of text and/or images, and/or the look and feel of branded interface 200. Branded interface 250 includes a branding canvas 252. Branding canvas 252 may be configured to display information and media according to specifications provided by authorized users of user console 164, for example, executive level franchise A and hotel A1 ... An users 120a, franchise B and restaurant B1 ... Bn users 130b, and/or business C1 ... Cn users 140a. Franchise A may, for example, have a consistent branding scheme for hotel A1 122, hotel A2 124 and hotel An 126. In turn, hotel A1 122 may have a sub-branding and/or a marketing scheme based on local attributes (e.g., resort, business). Branding schemes are specified, defined, designed, and/or modified using user console 164, which provides users with one or more interfaces for providing inputs related to branding (e.g., logos, graphics, media, text, campaigns).

In an example embodiment, the appearance of branded interface 250 is specific to the particular business and/or business location selected by the customer when interacting with select location interface 200. Branded interface 250 may include custom components such as, for example, a business An display 245. Business An display 245 may display a banner comprising a logo with custom information such as reference to the location of the business. Business An display 245 may be customized in user console 164.

In an example embodiment branded interface 250 includes menu options such as a browse option 256, a request option 258, a local option 260, and other options represented by menus n 262. In an example embodiment, default menu options may be automatically displayed on branded interface 250. Custom menu options may be configured for display by adjusting settings and/or by providing input to user console 164. Custom menu options may be useful for promoting a specific and/or time-limited offer. For example, a custom menu option featuring promotional materials may be displayed as menu n 262.

In an example embodiment, upon selection of a menu option on branded interface 250, a customer may be directed to further interfaces populated with specific options and offers. Information displayed may include listings of goods and/or services offered by the selected location, which may be particular to a business location, or may be offered by a franchise, brand, and/or local association which is part of a recommendation network.

Figure 2C:
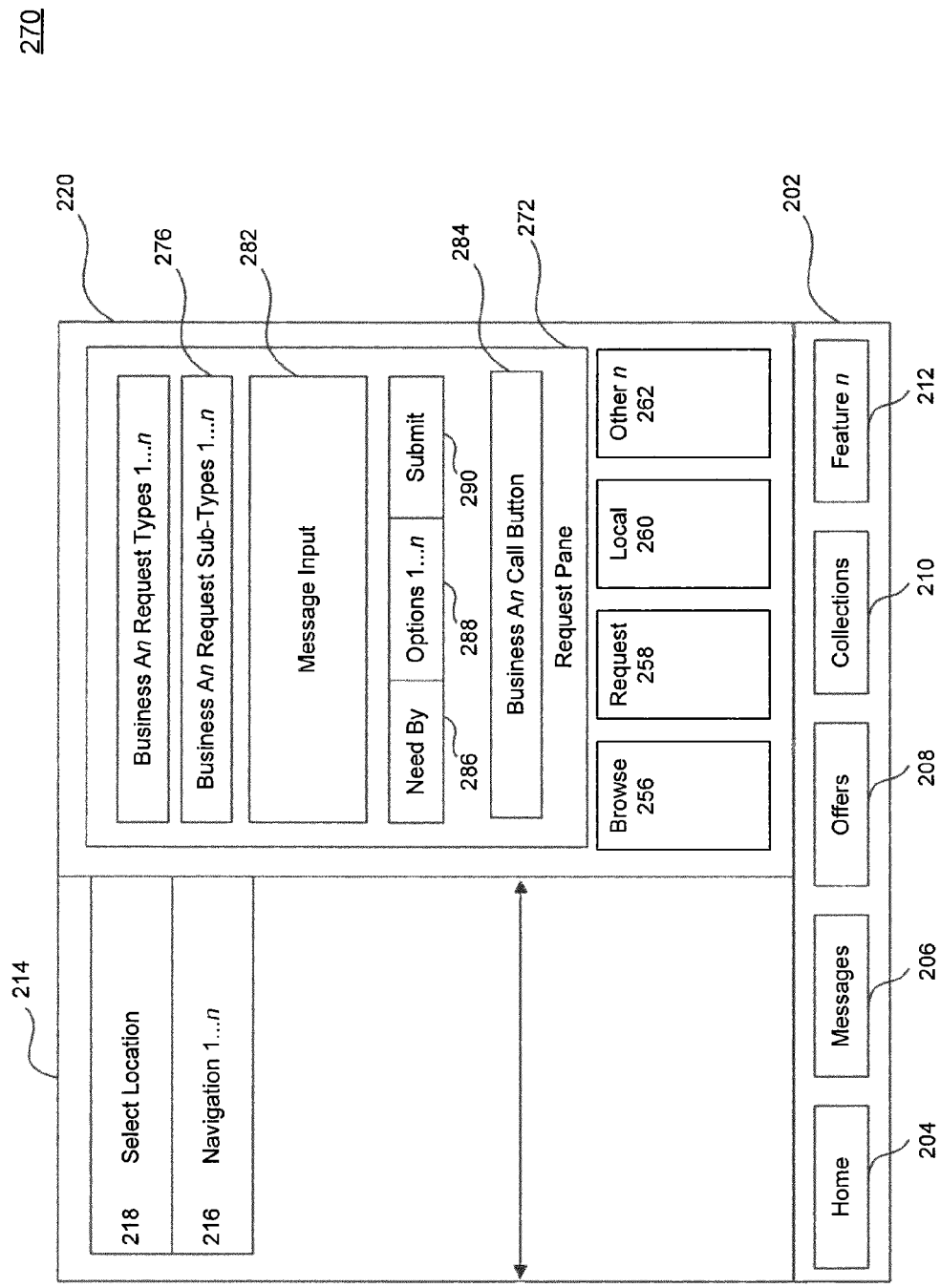
FIG. 2C is a block diagram of an example interface for receiving a request from a customer's mobile device, according to an example embodiment.

FIG. 2C illustrates a request interface 270 operable for receiving a request from a customer's mobile device A1 ... n 160. In an example embodiment, request interface 270 includes a request pane 272. Request pane 272 is displayed when a corresponding menu option such as, for example, request 258, is selected. Request pane 272 includes a listing component which displays one or more categories as business An request types 1 ... n 274. Business An request types 1 ... n 274 displays categories of services such as, for example, reservations and booking, room service, maid service, concierge, and/or other goods and services. Upon selection of a business An request types 1 ... n 274 category, sub-categories may be displayed as business An request sub-types 1 ... n 276. A hierarchy of categories and sub-categories may be provided depending on specifications provided in user console 164. Categories and sub-categories may be configured by franchise A and hotel A1 ... An users 120a, franchise B and restaurant B1 ... Bn users 130b, and/or business C1 ... Cn users 140a, for example, to reflect the types of goods and/or services offered based on available staff. In an example embodiment, a general category may be selected for broad or general requests which, for example, may not be amenable to categorical description (e.g., help).

In an example embodiment, request interface 270 includes a message input 282. Message input 282 is configured to receive messages input by a customer, for example, to indicate in natural language a request and/or to elaborate on requests specified using the selection of business An request type 1 ... n 274 and business An request sub-types 1 ... n 276. In an example embodiment, a message may be input without selecting a business An request type 1 ... n 274 and a business An request sub-types 1 ... n 276. By way of a non-limiting example, a customer may type into message input 282 a message such as "need help cleaning up a mess," which may be generically categorized as "Assistance" or more specifically as "Rooms & Suites" (Category) and "Cleaning Services" (Sub-Category).

In an example embodiment, request interface 270 includes a need by input 286, an options 1 ... n pane 288, and a submit button 290. Need by input 286 receives input from a customer indicating the date and time by which a request is requested. Need by input 286 may provide a user interface component for selecting a time from a look-up table or list of calculated estimated times for arrival based on, for example, the category selected by the customer. In an example embodiment, time intervals and/or plain language indications are listed (e.g., within one day, within the hour, by the end of the week, immediately, as soon as possible) allowing a customer to indicate whether or not a request is urgent.

In an example embodiment, options 1 ... n pane 288 may be auto-populated with options corresponding to the selected category and sub-category and/or default-populated with general inquiries related to specification of the request. Options displayed in options 1 ... n pane 288 or associated with one or more categories may be configured by franchise A and hotel A1 ... An users 120a, franchise B and restaurant B1 ... Bn users 130b, and/or business C1 ... Cn users 140a, for example, to reflect options based on the availability of staff, seasonal availability, time of day, and/or other restrictions or add-ons which may arise. A customer may select one or more options displayed on options 1 ... n pane 288 in the process of providing inputs to request interface 270.

In an example embodiment, a request input by a customer from a customer mobile device A1 ... n 160 may be transmitted as a request to server 102 when a submission of the request is executed by the customer. Submission of the request is effectuated by executing the request using submit button 290. Upon submission, a data structure corresponding to customer input into request interface 270 is transmitted to server 102 for processing.

In an example embodiment, customer mobile device A1 . . . n 160 is connected to a wireless local area network and/or telecommunications network operable to initiate and conduct phone calls. Request interface 270 includes a business An call button 284, which may be configured to dial a phone number corresponding to the selected category and/or a general help/concierge service. In an example embodiment, a directory is configured by franchise A and hotel A1 . . . An users 120a, franchise B and restaurant B1 . . . Bn users 130b, and/or business C1 . . . Cn users 140a on user console 164. The directly is mapped to one or more of the categories associated with request inputs. For example, a customer selecting the "Room Service" category may be connected directly to a concierge at that particular business location by executing a call using business An call button 284.

(c) Queuing Requests from a Customer Mobile Device

Figure 3:
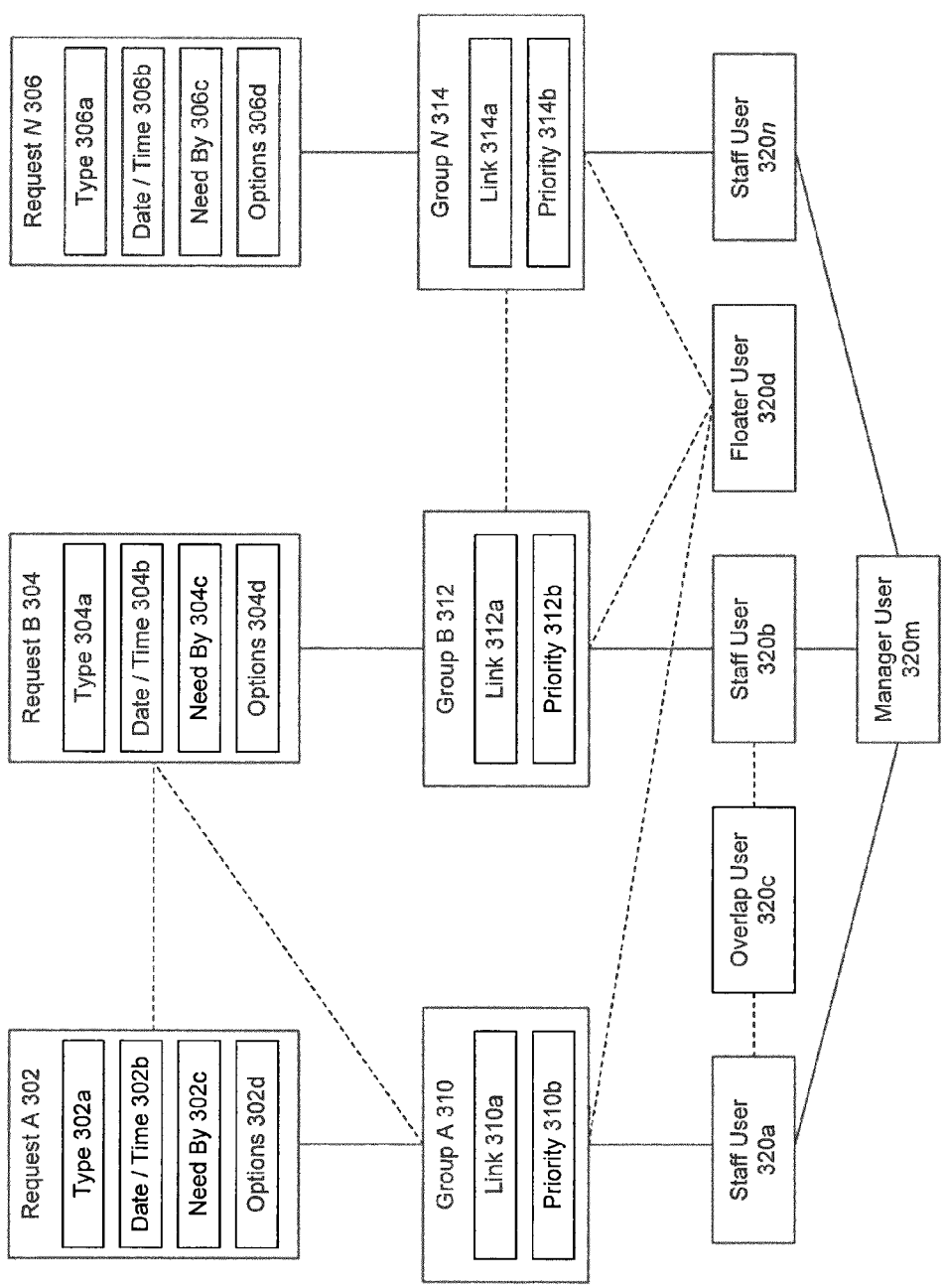
FIG. 3 is a block diagram of request types, according to an example embodiment.

FIG. 3 shows an example request structure 300 for receiving and queuing requests on request management system 150. In an example embodiment, one or more of request A 302, request B 304, and/or request N 306 are transmitted to server 102 for processing.

In an example embodiment, a request transmitted from a customer mobile device A1 . . . n 160 to server 102 is received by customer manager 106. Customer manager 106 may perform authentication. In an example embodiment, such authentication may involve confirming that the requesting customer mobile device A1 . . . n 160 is associated with an existing transaction account, booking record, or other verifiable information such as, for example, by providing credentials (e.g., birthdate, social security number). In an example embodiment, authentication may include triggering an alert delivered to one or more staff members employed at the target business, providing the phone number associated with a requesting customer mobile device A1 . . . n 160 and prompting the staff to make contact.

In an example embodiment, request A 302 is transmitted to business manager 108 for processing. Business manager 108 implements one or more business rules configured to assign request A 302 to one or more groups, such as, group A 310, group B 312, and/or group N 314. In an example embodiment, user console 164 receives inputs from franchise A and hotel A1 . . . An users 120a, franchise B and restaurant B1 . . . Bn users 130b, and/or business C1 . . . Cn users 140a to configure staff assignments based on, for example, one or more request types. Request types may reflect the category and sub-category indicated in, for example, request A 302. Request A 302 thus includes data relating to one or more of a type 302a, a date/time 302b, a need by input 302c, and a set of one or more options 302d.

In an example embodiment, request A 302 is assigned to one or more groups such as group A 310. Group A 310 is associated with a queue. The queue posts a link 310a and a priority indicator 310b. Link 310a points to request A 302 and its associated metadata. Priority indicator 310b reflects a priority value calculated by weighing and processing the elements of request A 302, which include type 302a, date/time 302b, need by input 302c, and options 302d. Business manager 108 may process the elements of request A 302 in accordance with one or more queuing rules in order to output priority indicator 310b. For example, a request for an airport shuttle in one week's time will be queued appropriately based on the need by input 302c, whereas an "emergency" request for clean-up services is prioritized to the front of the queue based on higher priority indicator 310b value.

FIG. 3 illustrates a plurality of requests. One having skill in the relevant art(s) will understand that a single request may be processed. For purposes of illustration, request B 304 includes a request type 304a, a date/time 304b, a need by input 304c, and a set of one or more options 304d. Request N 306 includes a request type 306a, a date/time 306b, a need by input 306c, and a set of one or more options 306d. More or less data components may be included in request A 302, request B 304 and/or request N.

FIG. 3 illustrates a plurality of groups. One having skill in the relevant art(s) will understand that only a single group may exist. For purposes of illustration, group B 312 includes a link 312a and a priority indicator 312b. Group N 314 includes a link 314a and a priority indicator 314b. More or less data components may be included.

By way of a non-limiting example, franchise A configures group A 310 to include each staff user associated with house-keeping services to be assigned requests for towels, toiletries, and bed making requests. An association with, for example, house-keeping may be defined according to role-based criteria available to managers such as, for example, a manager user 320m. Role-based definitions of staff users are associated with individual staff user accounts stored in user database 114. Users may be assigned to more than one group such as, for example, overlap user 320c. Overlap user 320 is associated with both group A 310 as well as group B 312. Thus, overlap user 320 may be assigned request type 302a and type 304a. In an example embodiment, a plurality of requests may be assigned to a particular group. Request A 302 and request B 304 may be assigned to group A 310, for example, in the event that group B 312 is unavailable (e.g., after hours of operation).

In an example embodiment, a request may be assigned to a plurality of groups. In an example embodiment, request N 306 may be assigned to group N 314 as well as group B 312, for example, in the event that request type 306a requires a large staff Franchise A and hotel A1 . . . An users 120a, franchise B and restaurant B1 . . . Bn users 130b, and/or business C1 . . . Cn users 140a may configure, re-configure, adjust, or modify categories of requests, associations between categories and request types, role-based definitions of staff users, associations between request types and roles, associations between staff users and groups, associations between staff users and request types, and/or associations between request types and groups. In an example embodiment, hotel A1 . . . An users 120a includes manager user 320m. Manager user 320m inputs configurations into user console 164.

In an example embodiment, a configuration assigning request types to groups and mapping groups to individual staff users is translated into a series of rules implemented by business manager 108. Rules implementing the configuration are processed by request tracker 112. Configurations may be stored in business database 118.

In an embodiment, request tracker 112 can define a set of users, each user associated with one or more groups, and define a list of request types, each request type assigned to at least one group, wherein each request type defines one or more requests receivable from a customer's mobile device. Request tracker 112 then receives a request from a customer's mobile device, wherein the customer's mobile device is configured to connect to the request management system to submit one or more requests defined by the set of request types; and assigns the request received from the customer to one or more groups assigned to fulfill the request type that includes the received request. Once the request is fulfilled, request tracker 112 can close the request in the request management system and sending a notification of completion to the customer's mobile device.

Request tracker 112 in assigning requests to groups can also select a group to handle the request based on the time the request is received and the time the request will be fulfilled. Request tracker 112 can also assign the request to a particular user of the one or more groups assigned to the request type and track the user's fulfillment of the request for example based on a determination of the duration between assigning the request to the particular user and fulfillment of the request.

Request tracker 112 can also assign the request to groups having different users and track partial fulfillment of the requests. For example, request tracker 112 can assign a request to a first user of a first group, track the first user's partial fulfillment of the request, assign the partially fulfilled request to a second user of a second group, and track tracking the second user's fulfillment of the request.

Request tracker 112 can also receive one or more feedback messages from the customer's mobile device and associate the feedback messages with the request in the request management system.

In an example embodiment, queued action items associated with a given group are aggregated into a feed. Feeds contain a prioritized queue of requests which may be coded for a status such as, for example, "hold," "unclaimed," "pending," and "complete." In an example embodiment, staff users associated with a particular group may be automatically subscribed to a feed associated with that group. For example, staff user 320a, overlap user 320c, and floater user 320o are associated with group A 310 and are subscribed to a feed generated by request tracker 112 which aggregates requests, incorporating the application of rules by business manager 108, to deliver targeted feeds listing requests and including a link to the original request. In an example embodiment, request A 302 is routed group A 310 according to rules and processes implemented by business manager 108, group A 310 encodes link 310a and priority 310b, and queues the request in business database 118. In an example embodiment, request handler 182 can make requests available to staff users who may view request feeds on user mobile devices B1 . . . n 162. Each staff user's individual account may include configurations for automatically subscribing each staff user to feeds corresponding to the groups to which they have been assigned. Request handler 182 can also select and make requests based on a request type and a defined associated of a staff user to particular request type. In this way, a staff user (such as a housekeeping team member charged with housekeeping) receives requests having a request type associated with housekeeping. Alternatively, request handler 182 can also select and make all requests available and provide request status and request type information so that a staff user can select an appropriate request to handle.

FIG. 4A is a flow diagram illustrating a method 400 for receiving and queuing requests using request management system 150, according to an example embodiment.

Method 400 begins at step 410, where a connection is established between one or more business entities and a customer's mobile device. A connection may be established automatically and/or by logging in to an account. For example, customer mobile device A1 160 can launch automatically or in response to a user selection concierge agent 161 to connect with server 102.

In an example embodiment, in step 410, customer mobile devices A1 . . . n 160 may connect to sever 102. Server 102 is connected to one or more business users, such as, franchise A and hotel A1 . . . An users 120a, franchise B and restaurant B1 . . . Bn users 130b, and/or business C1 . . . Cn users 140a. Business users connect to server 102 and may input, modify, and/or design offers and promotions using user console 164. Server 102 may also be connected to one or more user mobile devices B1 . . . n 162.

In an example embodiment, in step 420, information is obtained about the location of the customer's mobile device. Data relating to the location of customer mobile devices A1 . . . n 160 may be obtained from a geolocating service and/or location data accessible to server 102. Location information may be input by the customer. Customer manager 106 is configured to receive information about the location of customer mobile devices A1 . . . n 160. In an example embodiment, location information associated with customer mobile devices A1 . . . n 160 is stored in customer database 116. Alternatively, businesses may choose to opt-out and not store or collect location information on customers or to do so only have receiving confirmation or acceptance from customers.

In an example embodiment, in step 430, one or more sets of data describing goods and/or services currently offered by a particular business location are provided to the customer's mobile device. In an example embodiment, customers may select a particular business location prior to server 102 providing one or more sets of data describing goods and/or services currently offered. In an example embodiment, determining the location of customer mobile devices A1 . . . n 160 causes business manager 108 to automatically select the target business such as, for example, based on the instant location of customer mobile device A1 (e.g., in the lobby of a particular hotel).

In an example embodiment, in step 440, one or more requests for a good and/or service offered by a particular business location is received from the customer's mobile device. Business users such as franchise A and hotel A1 . . . An users 120a, franchise B and restaurant B1 . . . Bn users 130b, and/or business C1 . . . Cn users 140a populate and/or input offers for goods and/or services into user console 164. User console 164 communicates output from offer and promotion design workflow to user manager 104. Inventories of goods and/or services may be stored in user database 114. One or more inventories may be associated with a particular business user and/or association of businesses.

In an example embodiment, a customer selects one or more categories of requests displayed on request interface 270 as business An request types 1 . . . n 274 and business An request sub-types 1 . . . n 276. Categories may be provided depending on specifications provided by business users on user console 164 to reflect, for example, types of goods and/or services offered based on, for example, available staff, goods and/or services listed in an inventory stored in user database 114. In an example embodiment, a customer inputs a request into request interface 270 by providing a request as message input 282, need by input 286, and one or more options 1 . . . n pane 288.

In an example embodiment, a request input by a customer from a customer mobile device A1 . . . n 160 may be transmitted as a request to server 102 when a submission of the request is executed by the customer. Submission of the request is effectuated by executing the request using submit button 290. Upon submission, a data structure corresponding to customer input into request interface 270 is transmitted to server 102 for processing.

In an example embodiment, in step 450, the request is added to a queue associated with one or more groups assigned to fulfill the request. A request transmitted from a customer mobile device A1 . . . n 160 to server 102 is received by customer manager 106. Customer manager 106 may perform authentication. In a non-limiting example, request A 302 is transmitted to business manager 108 for processing. Business manager 108 assigns request A 302 to one or more groups, such as, group A 310, based on the request type.

In an example embodiment, group A 310 is associated with a queue. The queue posts link 310a and priority indicator 310b as an item, task, and/or action item associated with request A 302. Link 310a points to request A 302 and associated metadata. Priority indicator 310b reflects a priority value. In an example embodiment, the combination of, for example, link 310a and priority indicator 310b comprise an item, task, and/or action item which is queued for fulfillment by, for example, group A 310.

Further examples of display interfaces and data flows that can be used in queuing requests are described below and are not intended to limit method 400.

(d) Handling Requests from a Staff User Mobile Device

FIG. 2D illustrates an example branded interface 290 for providing a customizable brand display to a staff user's mobile device A1 . . . n 162. In an example embodiment, the display of branded interface 290 reflects the specifications provided by authorized users of user console 164. Such specifications may include logos, media, displays of text and/or images, and/or the look and feel of branded interface 290. Branded interface 290 includes a branding canvas 252. Branding canvas 252 may be configured to display information and media according to specifications provided by authorized users of user console 164, for example, executive level franchise A and hotel A1 . . . An users 120a, franchise B and restaurant B1 . . . Bn users 130b, and/or business C1 . . . Cn users 140a. In this case, compared to FIG. 2B the branding and content may be selected to be fitted for a staff user audience rather than a customer. Franchise A may, for example, have a consistent branding scheme for hotel A1 122, hotel A1 122 and hotel An 126. In turn, hotel A1 122 may have a sub-branding and/or a marketing scheme based on local attributes (e.g., resort, business). Branding schemes are specified, defined, designed, and/or modified using user console 164, which provides users with one or more interfaces for providing inputs related to branding (e.g., logos, graphics, media, text, campaigns).

In an example embodiment, a global navigation bar 292 includes controllers for accessing one or more interfaces such as a home interface 204, a requests interface 206, an offers interface 208, a collections interface 210, and others represented by feature n 212. Global navigation bar 292 may be displayed in whole or in part across different interfaces. Interfaces may be supported and displayed by a native application or web application such as concierge staff agent 163 operating on staff user mobile devices A1 . . . n 162. The operation of requests interface 206 and other interfaces and displays output by concierge staff agent 163 to help a staff user fulfill requests and respond to alerts are described further below.

In an example embodiment, the appearance of branded interface 290 is specific to the particular business and/or business location selected by the staff user when interacting with a select location interface 200. Branded interface 290 may include custom components such as, for example, a business An display 245. Business An display 245 may display a banner comprising a logo with custom information such as reference to the location of the business. Business An display 245 may be customized in user console 164.

In an example embodiment branded interface 290 includes menu options such as a browse option 256, a request option 258, a local option 260, and other options represented by menus n 262. In an example embodiment, default menu options may be automatically displayed on branded interface 290. Custom menu options may be configured for display by adjusting settings and/or by providing input to user console 164. Custom menu options may be useful for promoting a specific and/or time-limited offer. For example, a custom menu option featuring promotional materials may be displayed as menu n 262.

In an example embodiment, upon selection of a menu option on branded interface 290, a staff user may be directed to further interfaces populated with specific options and offers. Information displayed may include listings of goods and/or services offered by the selected location, which may be particular to a business location, or may be offered by a franchise, brand, and/or local association which is part of a recommendation network.

Figure 4B:
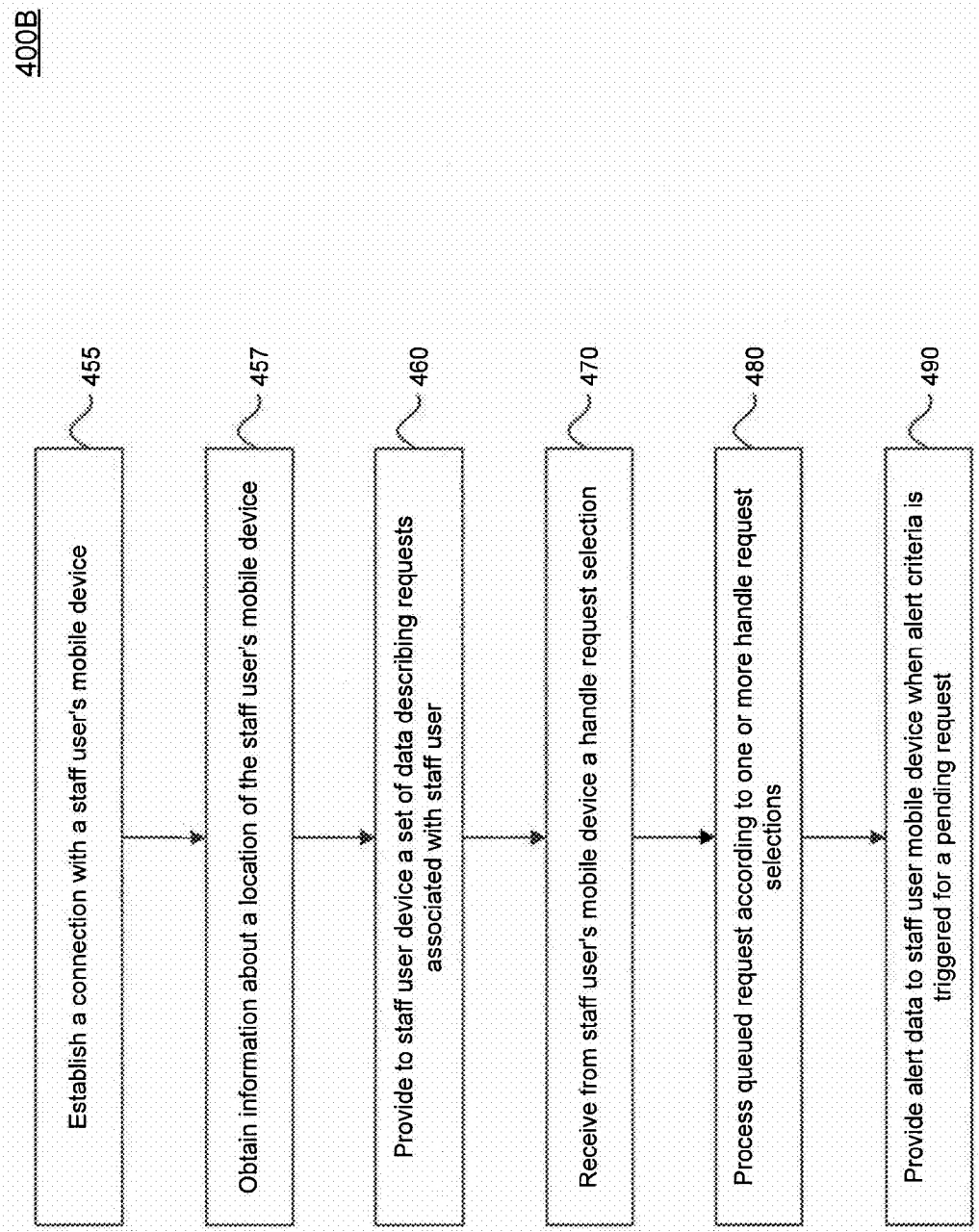
FIG. 4B is a flowchart illustrating a process for handling queued requests, according to an example embodiment.

FIG. 4B is a flow diagram illustrating a method 400B for enabling staff users to handle queued requests using request management system 150, according to an example embodiment (steps 455-490).

Method 400B begins at step 455, where a connection is established between one or more business entities and a staff user's mobile device 162. A connection may be established automatically and/or by logging in to an account. For example, customer mobile device B1 162 can launch concierge staff agent 163 automatically or in response to a staff user selection to connect with server 102.

In an example embodiment, in step 455, user mobile devices B1 . . . n 162 used by staff users may connect to server 102. Server 102 is connected to one or more business users, such as, franchise A and hotel A1 . . . An users 120a, franchise B and restaurant B1 . . . Bn users 130b, and/or business C1 . . . Cn users 140a. Business users connect to server 102 and may input, modify, and/or design offers and promotions using user console 164. Server 102 may also be connected to one or more customer mobile devices A1 . . . n 160.

In an example embodiment, in step 457, information is obtained about the location of the staff user's mobile device. Data relating to the location of staff user mobile devices B1 . . . n 162 may be obtained from a geolocating service and/or location data accessible to server 102. Location information may be input by the staff user as well. User manager 104 is configured to receive information about the location of staff user mobile devices B1 . . . n 162. In an example embodiment, location information associated with staff user mobile devices B1 . . . n 162 is stored in customer database 116. Alternatively, businesses may choose to opt-out and not store or collect location information on staff users or to do so only have receiving confirmation or acceptance from staff users.

In an example embodiment, in step 460, one or more sets of data describing requests associated with a respective staff user are provided to the staff user's mobile device 162. Concierge staff agent 163 can then render for display one or more interfaces that allow a staff user to fulfill requests. For example, a branded interface 290 can be displayed having a Requests button 296 that allow a staff user to input a selection to handle outstanding requests (such as queued requests described above with respect to FIG. 3).

Server 102 (and in particular request handler 182) then receives an indication that a staff user mobile device has requested handling of outstanding customer requests. (step 470).

Request handler 182 then processes queued requests stored in business database 118 according to one or more handle request selections made by staff users at user mobile devices 162 (step 480). For example, request handler 182 can obtain data relating to one or more queued requests and send the data to a user mobile device 162 in response to requests made by concierge staff agent 163. Concierge staff agent 163 can render the received data relating to queued requests from request handler 182 in one or more branded or unbranded interfaces to enable a staff user to fulfill the queued requests for customers. Request handler 182 can provide data relating to queued requests including but not limited to, request status, request type, request priority, request viewed or unviewed information, count, metadata, categories, groups, sub-categories, or other data. Data to facilitate rendering such as images, themes, color attributes, user interface elements, descriptive text, menus, or other attributes can be provided as well. In one example, concierge staff agent 163 can re-skin and output new interfaces for display using a framework or template based on the received data and associated graphical attributes or user-interface elements.

FIG. 4C shows an example method for processing queued requests in step 480 in further detail (steps 482-488). First, queued request summary information including request status and request type information is provided by request handler 182 at server 103 to concierge staff agent 163 at staff user mobile device 162 in response to one or more staff user selections (step 482). In one embodiment, request status can include different stages relating to handling of a queued request. These stages can be include but are not limited to approval, pending, accepted, and closed. Request type can be any information relating to a type of request. Types of requests can include but are not limited to any request relating to a concierge or hospitality service, such as, reservations & booking help, requests for towels, coffee, shampoo & conditioner, other supplies, valet, maintenance, nearby restaurant information, complaints, or other requests. Data on images, descriptive text, graphical attributes, user interface elements or data structures can also be provided to facilitate display of interface(s) to a staff user by concierge staff agent 163. Viewing summary request information can allow a staff user with a user mobile device 162 to quickly identify or assess the relative volume of requests at different stages, relative counts of different request types, and/or identify whether requests have been viewed previously through one or more branded or unbranded interfaces output by concierge staff agent 163.

Data can also be sent from request handler 182 to concierge staff agent 163 to enable a staff user to view particular requests grouped by request status and request type (step 484), to enable a staff user to change a particular request status (step 486), and/or enable a staff user handling a request to input a message to a customer (step 488). In step 484, request handler 182 can select and make requests from business database 118 based on a request type and a defined association of a staff user to particular request type. In this way, a staff user (such as a housekeeping team member charged with housekeeping) receives requests having a request type associated with housekeeping. Alternatively, request handler 182 can also select and make all requests available and provide request status and request type information so that a staff user can select an appropriate request to handle.

As mentioned before, data on images, descriptive text, graphical attributes, user interface elements or data structures can also be provided to facilitate display of branded or unbranded interface(s) to a staff user by concierge staff agent 163.

(e) Alert Generation

Figure 12A:
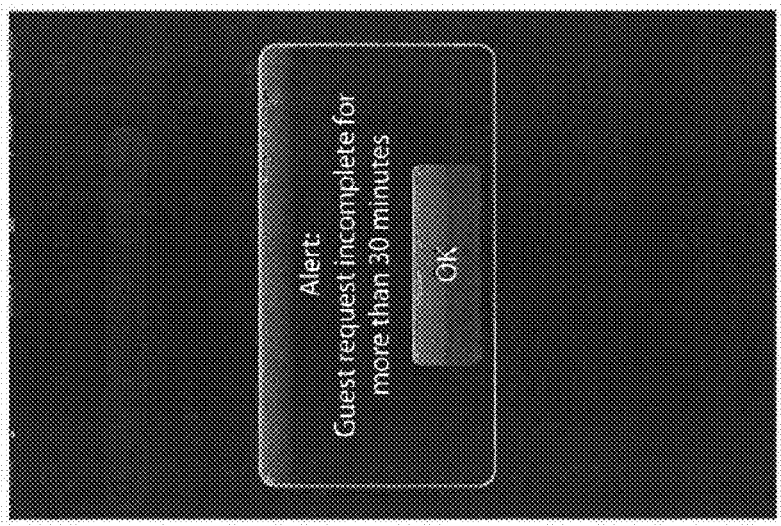
FIGS. 12A and 12B show further examples of interfaces relating to push alerting data to a staff user.
Figure 12B:
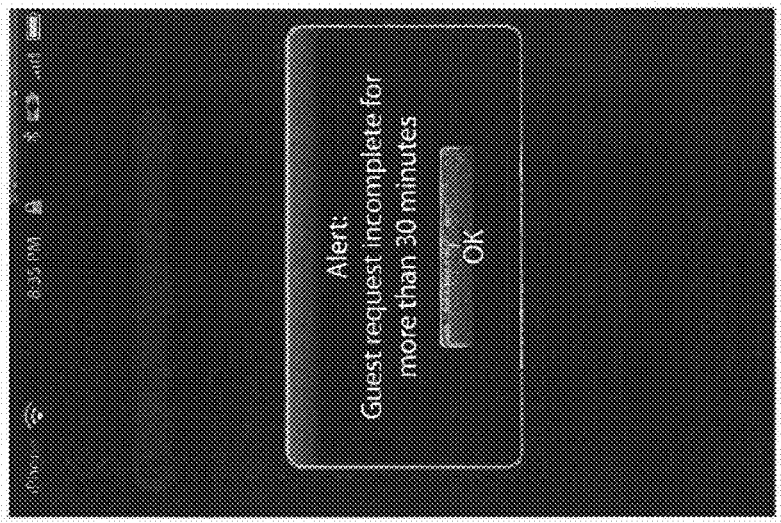

In a further feature, method 400B further provides alert data to a staff user mobile device 162 when alert criteria is triggered for one or more pending requests (step 490). For example, alert generator 184 monitors queued pending requests and determines when alert criteria have been met. Such alert criteria can include but is not limited to a time duration in which a request has been pending or remains incomplete, thresholds for a number of pending requests in total or by group or category of request, a ratio of a number of pending requests in total or by group or category of request to a number of available staff users, or a priority value. For example, alert generator 184 can obtain alert data relating to one or more queued requests and push the alert data to a user mobile device 162. Concierge staff agent 163 can render the received alert data in one or more branded or unbranded interfaces to notify a staff user. FIG. 12A shows an example of an alert interface displayed by concierge staff agent 163 when a customer request (such as a hotel guest request) has been incomplete for more than 30 minutes. This alert display can include a user interface element (such as an OK button) for a staff user to select to acknowledge viewing of the alert (FIG. 12B).

Further examples of interfaces and data flows to handle requests which are not intended to limit method 400 are described below with respect to FIGS. 6-11. Next, a feature relating to providing a customizable brand display is discussed in further detail with respect to FIG. 5.

(f) Providing a Customizable Brand Display on a Customer Mobile Device

Figure 5:
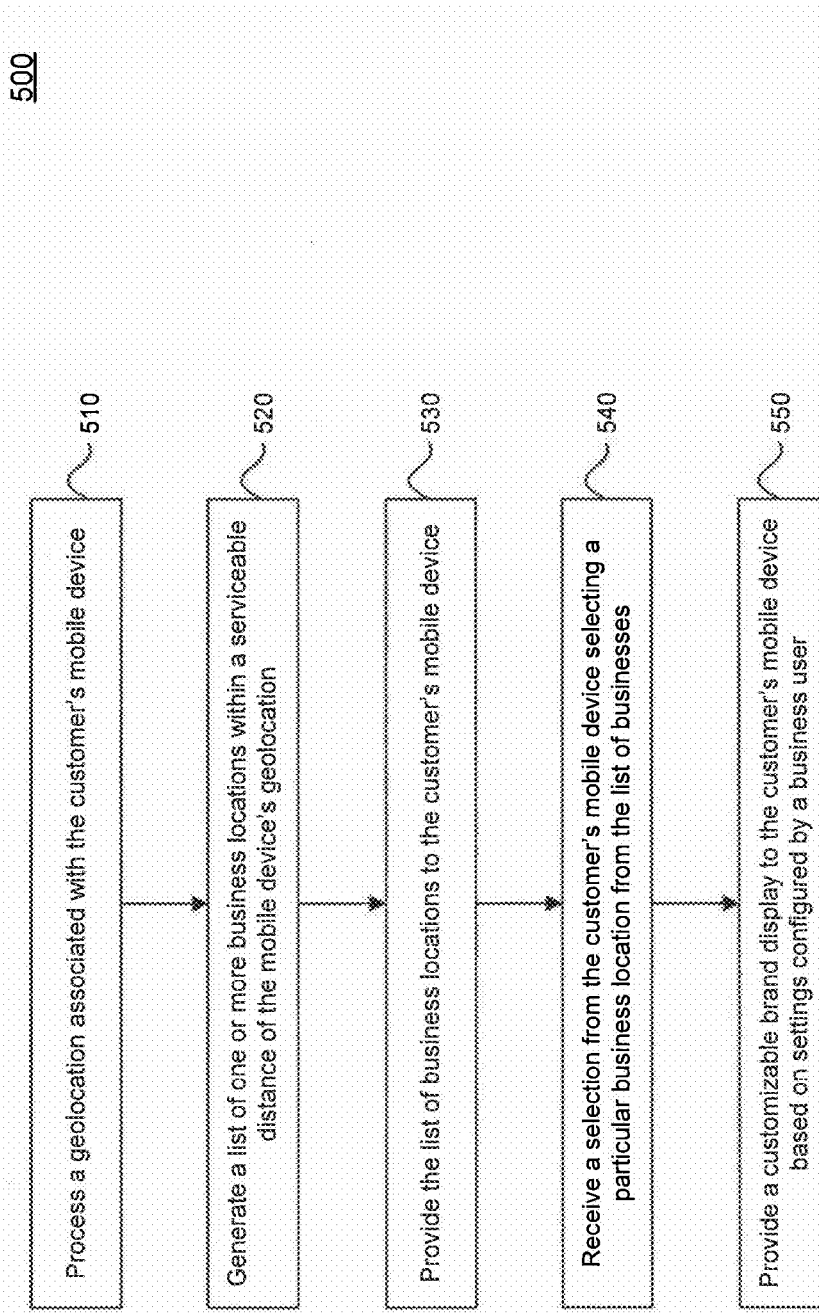
FIG. 5 is a flowchart illustrating a process for providing a customizable brand display, according to an example embodiment.

FIG. 5 is a flow diagram illustrating a method for providing a customizable brand display to the customer's mobile device based on settings configured by a business user, according to an example embodiment.

Method 500 begins at step 510, where a geolocation associated with a customer's mobile device is processed. Customer manager 106 may collect or receive location data from customer mobile devices A1 . . . n 160 such as, for example, geolocation and/or data accessible to a server connected to a mobile client. In an example embodiment, customer database 116 stores customer data such as, for example, a location provided by customers operating customer mobile devices A1 . . . n 160, a location sensed and/or received from a geolocating service accessible upon connecting with one or more customer mobile phone devices A1 . . . n 160, information provided by the customer in a survey and/or other form or inquiry, information not provided by the customer but known, accessible, or otherwise available, for example, based on a log or history.

In an example embodiment, customer manager 106 communicates the geolocation associated with, for example, customer mobile device A1 160, to business manager 108. Business manager 108 may perform one or more queries against business database 118. Recommendation engine 110 may apply additional characterization, filtering, and sorting of results generated by business database 118. Recommendation ermine 110 may generate query syntax reflecting a decision tree of criteria and prioritization based on, for example, proximity of location, relevance to search terms input or deduced from context triggers, partnerships or promotional agreements, such as those reflected by association with the recommendation network, and/or prediction using one or more algorithms.

In an example embodiment, in step 520, a list of one or more business locations within a Serviceable distance of the mobile device's geolocation is generated. Business manager 108 may output an information rich listing based on, for example, proximity to a customer's geolocation, recommended businesses, and/or other criteria. Listings may be filtered, sorted, and/or arranged by customer manager 106.

In an example embodiment, in step 530, the list of business locations is provided to the customer's mobile device. Customer manager 106 posts and/or pushes the listing to customer mobile devices A1 . . . n 160. The listing may be displayed by a native application and/or web application operating on customer mobile devices A1 . . . n 160. In an example embodiment, results are displayed on search interface 200 as results output 1 . . . n 234. Results output 1 . . . n 234 display corresponding indicia such as criteria 1 . . . n 236 useful for sorting, organizing, and/or arranging results output 1 . . . n 234. Results output 1 . . . n 234 may be filtered by a customer using, for example, a filter input 228.

In an example embodiment, in step 540, a selection, selecting a particular business location from the list of businesses, is received from the customer's mobile device. The customer selects a particular business location by selecting the corresponding item on the information rich listing, the selection generating a corresponding request to server 102.

In an example embodiment, in step 550, a customizable brand display is provided to the customer's mobile device based on settings configured by a business user. Display of branded interface 250 reflects the specifications provided by authorized users of user console 164. Branding canvas 252 is configured to display information and/or media according to specifications provided by users of user console 164, for example, executive level franchise A and hotel A1 . . . An users 120*a*, franchise B and restaurant B1 . . . Bn users 130*b*, and/or business C1 . . . Cn users 140*a*. The appearance of branded interface 250 is specific to the particular business and/or business location selected by the customer when interacting with select location interface 200. Branded interface 250 may include custom components such as, for example, a business An display 245. Business An display 245 may display a banner comprising a logo with custom information such as reference to the location of the business. Business An display 245 may be customized in user console 164.

(g) Example Interfaces for Queuing And Processing Requests from a Customer

FIGS. 6A-10PP show further embodiments relating to queuing requests from a customer and to handling the requests so that staff users may fulfill the requests as described earlier with respect to FIGS. 1A-4C. In particular, specific examples of interfaces that may be output by concierge agent 161 for a customer making a request for a concierge or hospitality service are described with respect to FIGS. 6A-6B, 7A-7L, 8A-8B, 9A-9D, 10I, 10J, 10N, 10X, 10EE, 10FF, 10JJ, 10OO, and 10PP (an example label directed to a trademark CONNECT by Monscierge Inc. of Oklahoma City, Okla. is included to show these examples may be displayed by concierge agent 161). Specific examples of interfaces that may be output by concierge staff agent 163 for a staff user fulfilling a request for a concierge or hospitality service and respond to an alert are described with respect to FIGS. 10A-H, 10K-10M, 10O-10W, 10Y-10Z, 10AA-10DD, 10GG-10II, 10KK-10NN, and 12A-12B (an example label directed to a trademark CONNECT STAFF by Monscierge Inc. of Oklahoma City, Okla. is included to show these examples may be displayed by concierge staff agent 163). These examples are illustrative and not intended to be limiting.

Figure 6B:
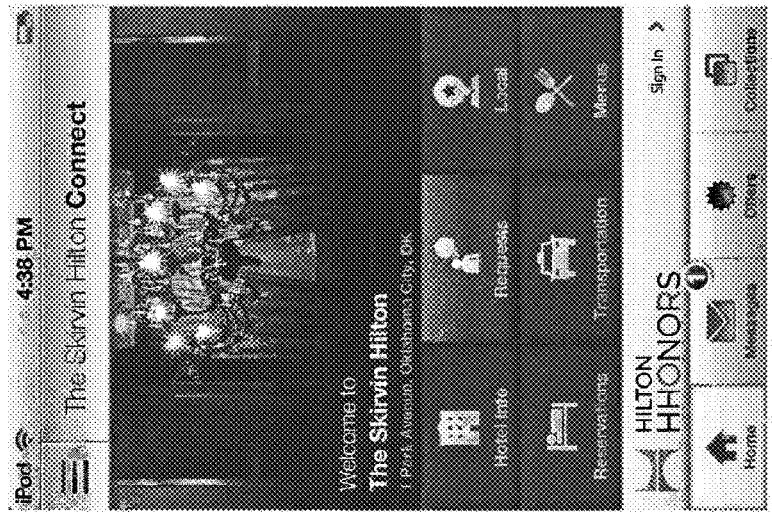
Figure 6A:
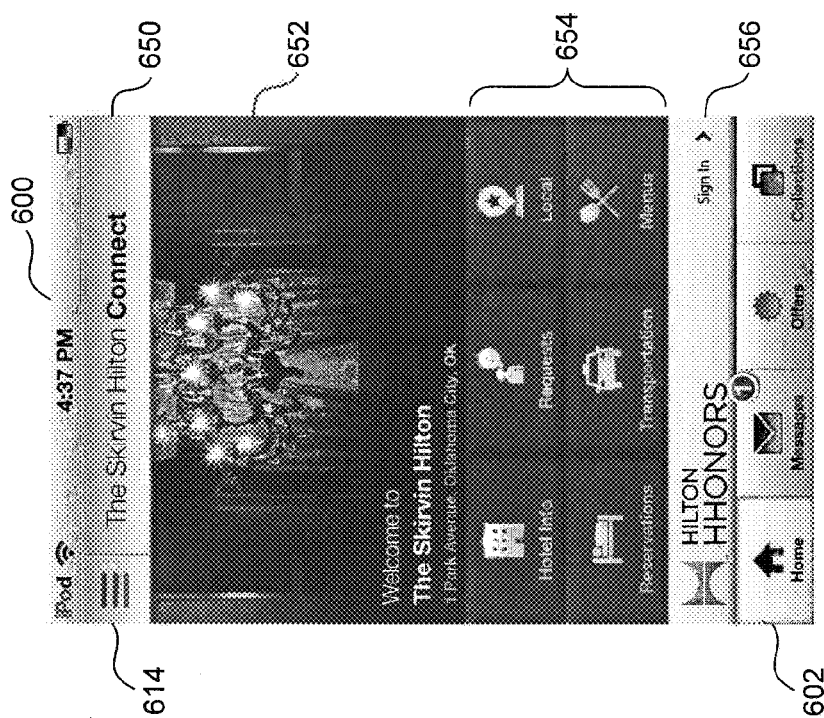

FIG. 6A shows an example of a branded interface 600 that may be displayed by a concierge agent 161 on customer mobile device A1 customized for a hotel and/or franchise according to the location information. In particular, this an example of a Home Page where users (e.g., customers such as hotel guests) press the Requests button in menu 654 to submit a request. In one example, concierge agent 161 can re-skin and output new interfaces for display using a framework or template based on received data and associated graphical attributes or user-interface elements.

A global navigation bar 602 has interfaces allowing a customer to select Home, Messages, Offers and Collections. Branded interface 600 includes a navigation pane 614 alongside a business display 650. Below this a branding canvas 652 for a business associated with the location information is displayed. A set of menu options 654 has interfaces allowing a user to select Hotel Info, Requests, Local, Reservations, Transportation and Menus. Another branded interface 656 allows a user to access information for a related franchise or enterprise 656. FIG. 6B shows the Home Page branded interface of FIG. 6A where the Request button is pressed by a user. Examples where a user makes requests for shampoo & conditioner, towels, and valet service are now discussed.

Figure 7B:
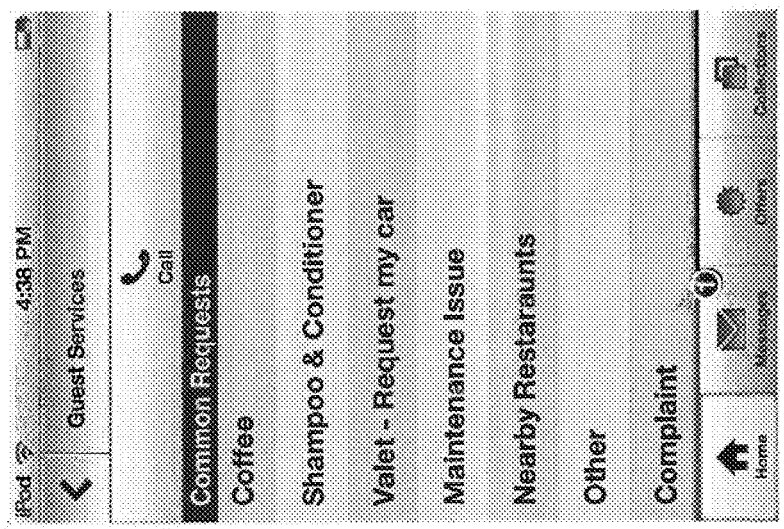
Figure 7A:
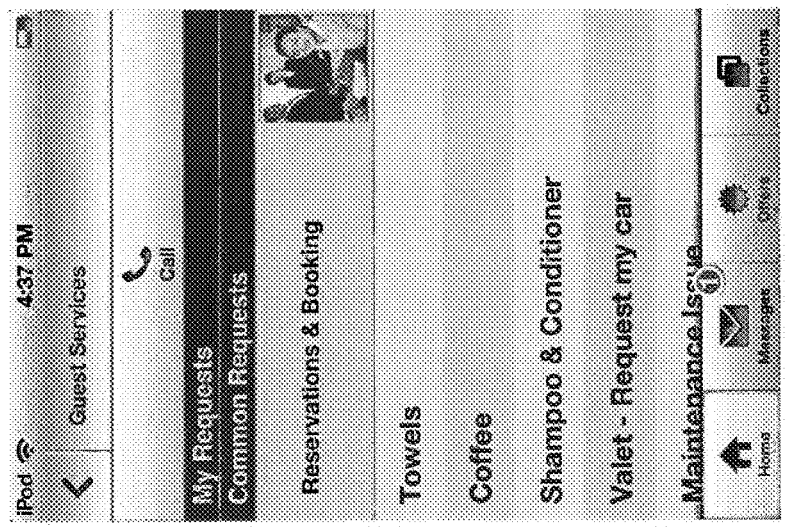
Figures 7C, 7D:
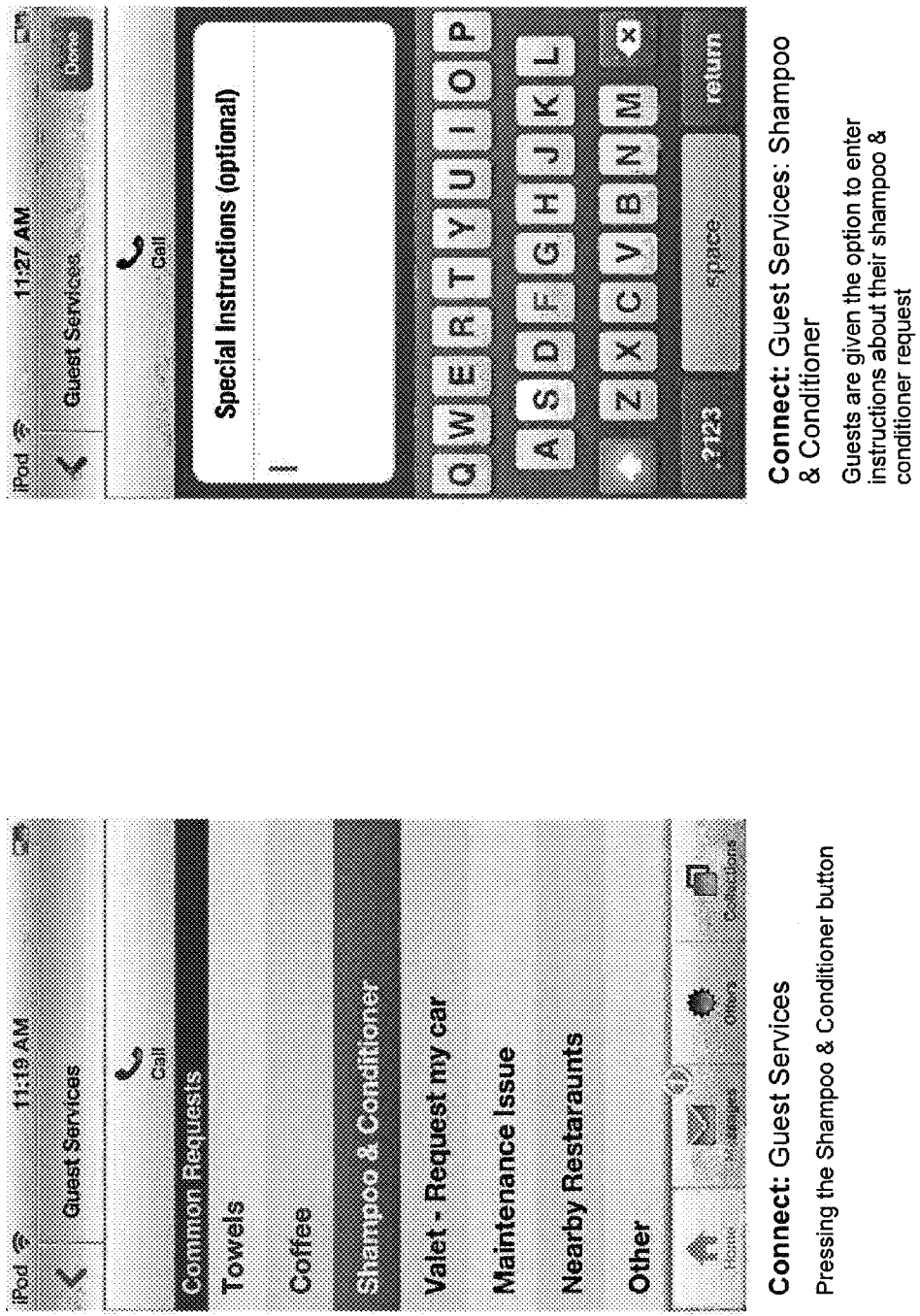
Figure 7F:
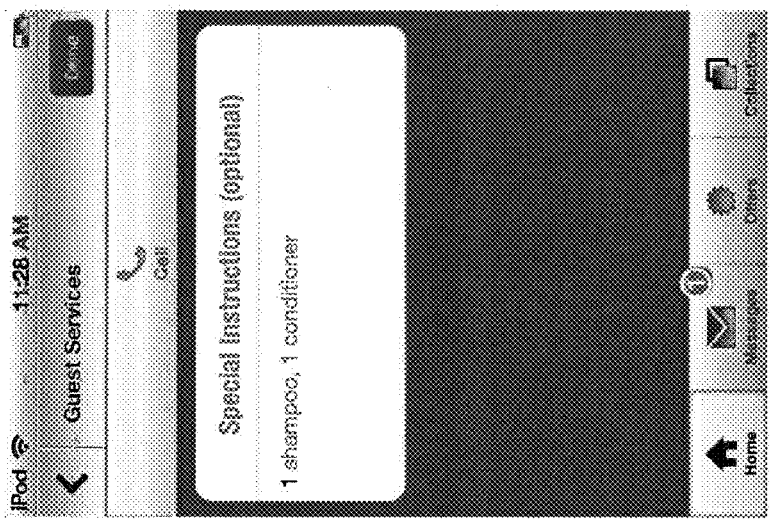
Figure 7E:

FIG. 7A shows a Guest Services interface showing a display page where after pressing the Requests button, users are brought. FIG. 7B shows a continuation of the Guest Services page shown in FIG. 7A visible in response to a user scrolling. FIG. 7C shows the Guest Services page where a Shampoo & Conditioner button is pressed by user to make a particular request. FIG. 7D shows the Guest Services: Shampoo & Conditioner page with a text input element where users are given the option to enter instructions about their shampoo & conditioner request. FIG. 7E shows the Guest Services: Shampoo & Conditioner page where text is entered into a Special Instructions box. FIG. 7F shows the Guest Services Shampoo & Conditioner page where after text is entered, a Done button is pressed.

Figure 7H:
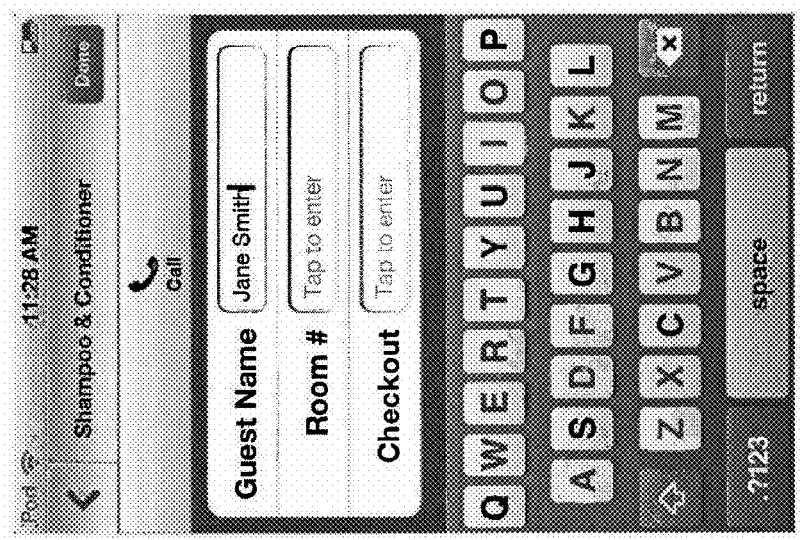
Figure 7G:
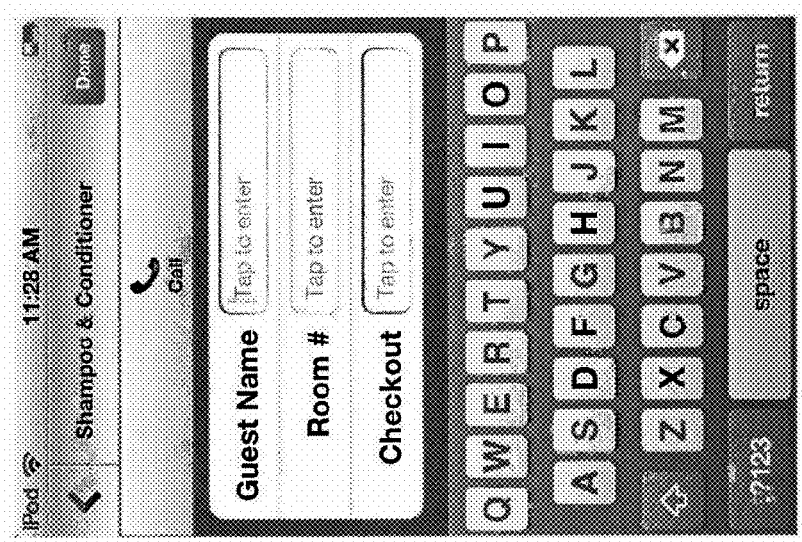
Figure 7J:
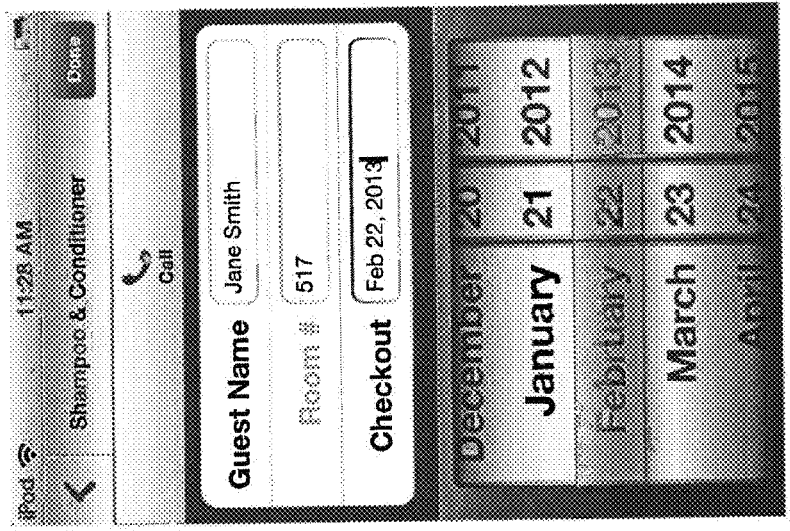
Figure 7I:
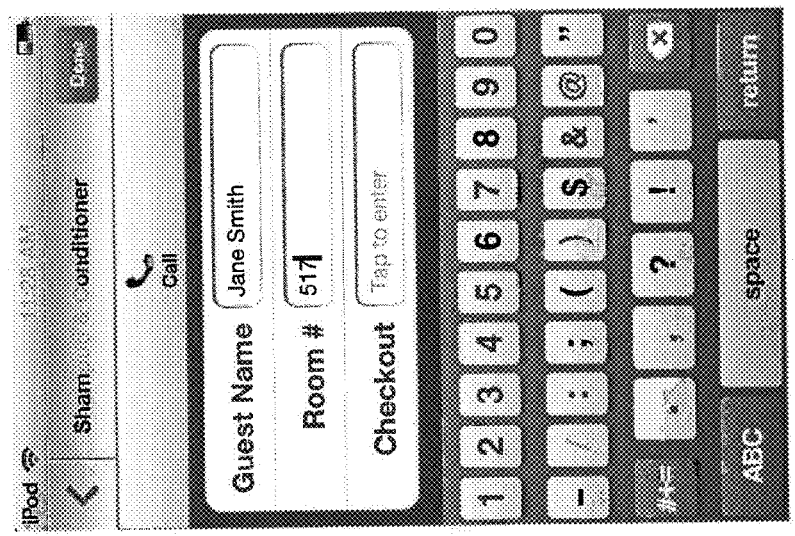

FIG. 7G shows a Guest Services: Shampoo & Conditioner page where after pressing done shown in FIG. 7F, users are brought to this page to enter their name, room number, and checkout date. FIG. 7H shows the Guest Services: Shampoo & Conditioner page where text is entered into the Guest Name box. FIG. 7I shows the Guest Services: Shampoo & Conditioner page where text is entered into the Room Number box. FIG. 7J shows the Guest Services: Shampoo & Conditioner page where entering the checkout date defaults to the current date. FIG. 7K shows the Guest Services: Shampoo & Conditioner page where the user is changing the checkout date.

Figure 7L:
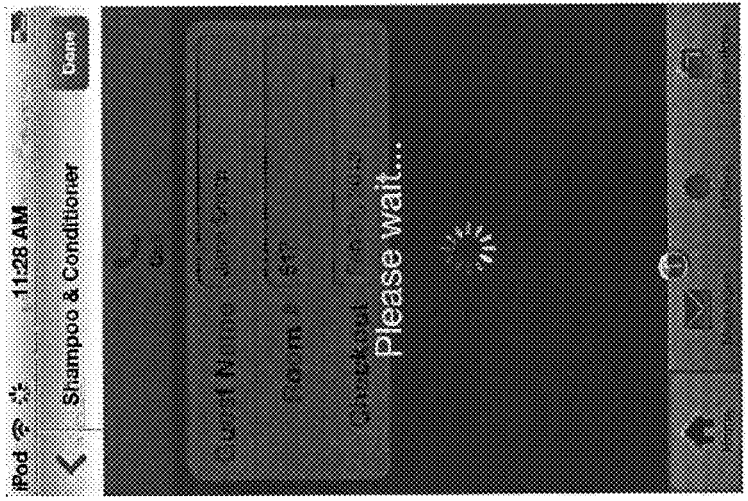
Figure 7K:
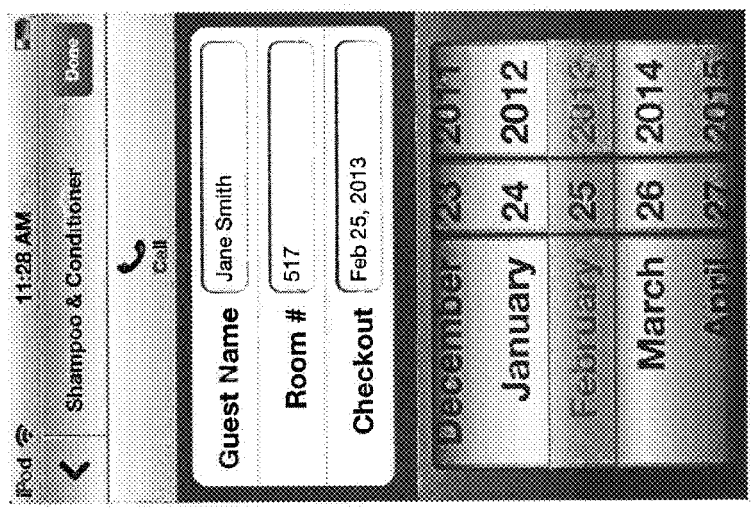

FIG. 7L shows the Guest Services: Shampoo & Conditioner page where after entering the information, users press the Done button at the top right. Concierge agent 161 then processes the entered information and sends it to server 102 for tracking by request tracker 112.

Figures 8A, 8B:
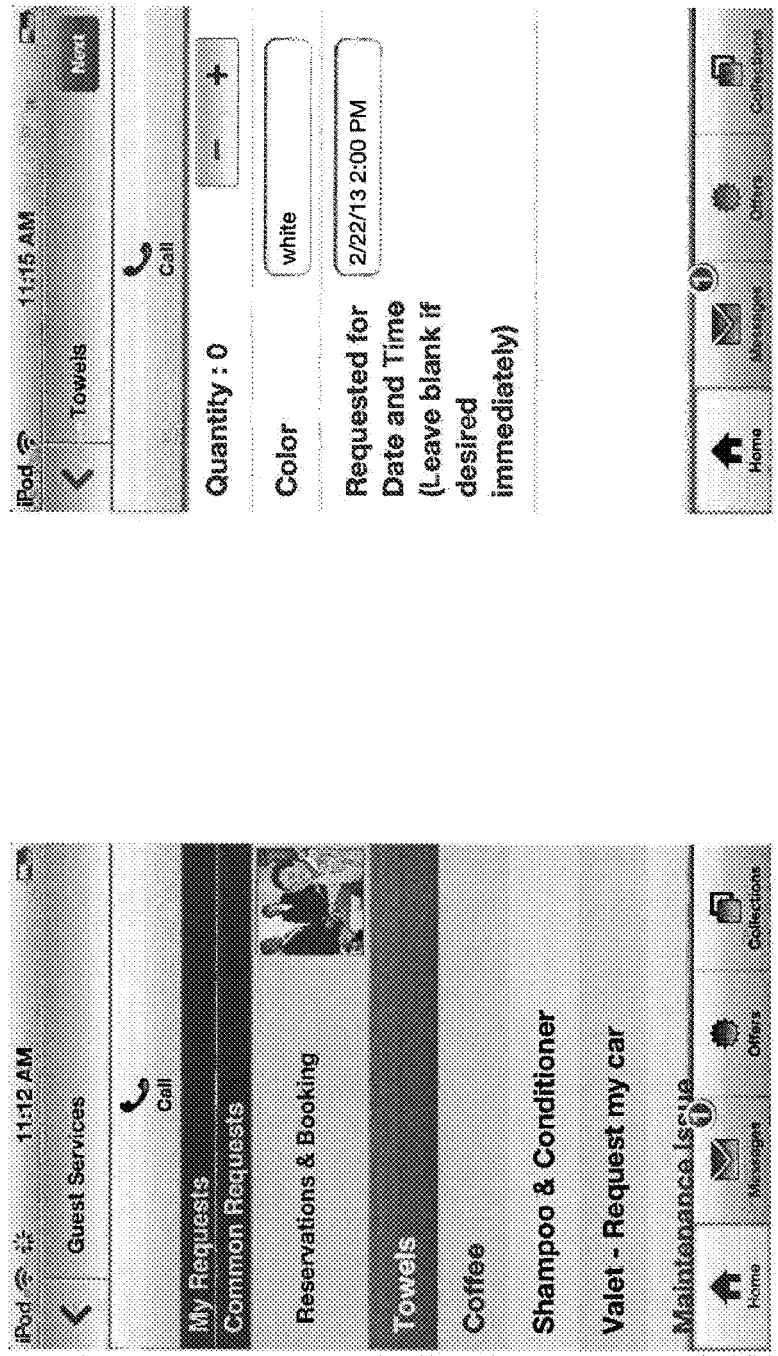

In another example, a user can request towels using concierge agent 161. FIG. 8A shows a Guest Services page where the Towels button is pressed. FIG. 8B shows a Guest Services: Towels page where guests are given the option to enter details about their towel request (e.g., quantity, color, requested for data and time). Users may then brought to a page where they enter their name, room number, and checkout date as described earlier.

In another example, a user can request valet service to request his or her car using concierge agent 161. FIG. 9A shows a Guest Services page where the Valet button is pressed. FIG. 9B shows a Guest Services: Valet page where the guests enter the time they would like the Valet to bring their vehicle. FIG. 9C shows a Guest Services: Valet page where the guests enter their valet ticket number. FIG. 9D shows a Guest Services: Valet page where after guests enter in the request details, they hit Next. They may then are then brought to the page where they enter their name, room number, and check-out date.

Further examples of interfaces that may be output by concierge staff agent 163 for a staff user fulfilling a request for a concierge or hospitality service and respond to an alert are described. FIG. 10A shows a Staff: Home Page which resembles the guest-facing Home Page. Instead of a Messages button at the bottom, there is a Requests button. FIG. 10B shows the Staff: Home page where staff can click on either the main Requests button on the home page (seen here) or the Requests button at the bottom.

FIG. 10C shows the Staff: Requests page where staff can see requests by category of status: Approvals, Pending, Accepted, and Closed. Each status category then breaks down by request type. The numbers in parentheses represent the number of requests that have not been viewed in that category. The number on the right represents the total requests in that category that have been viewed.

Figure 10J:
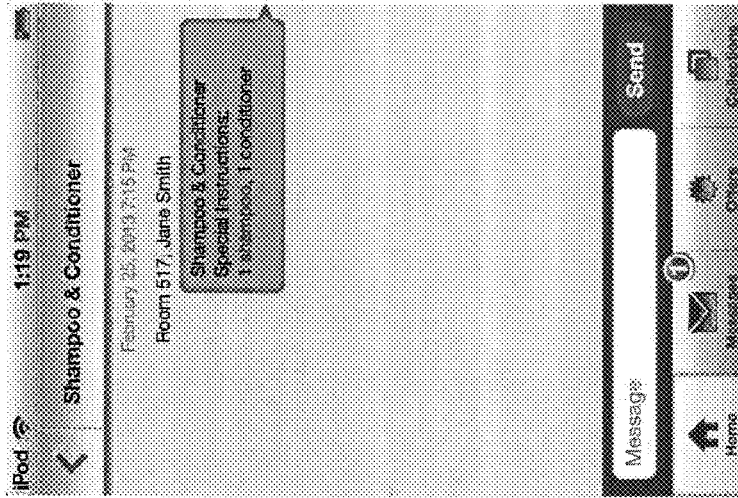
Figure 10I:
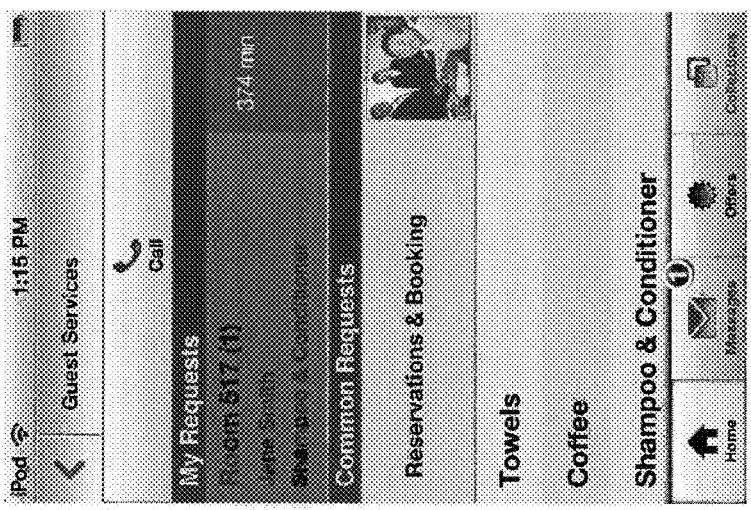
Figure 10L:
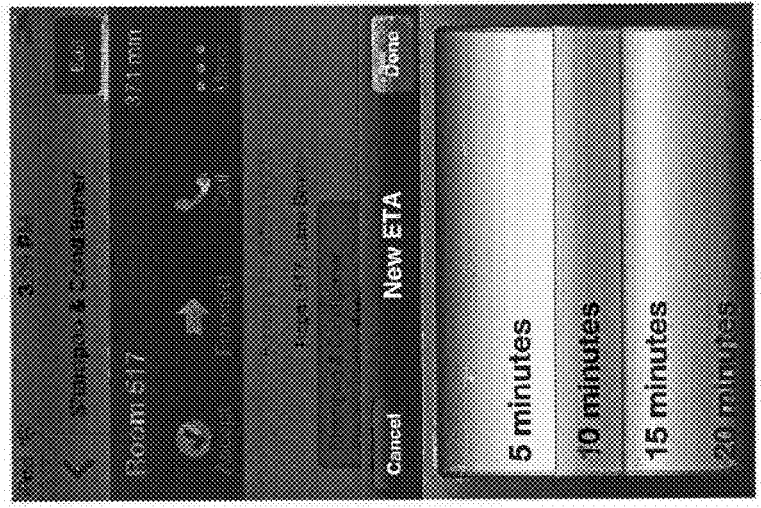
Figure 10K:
Figure 10Q:
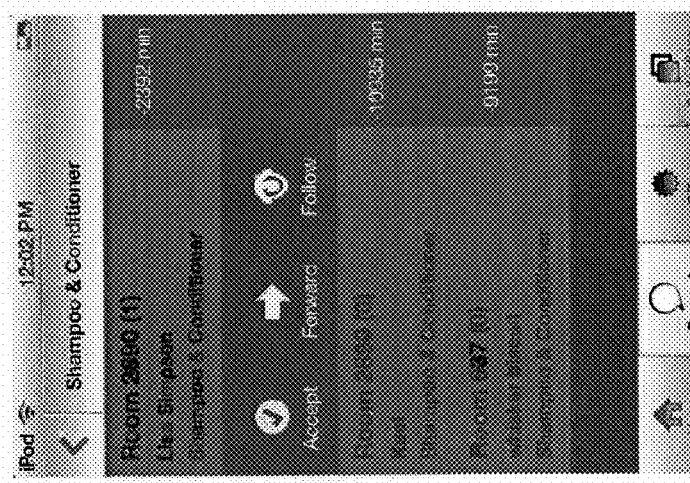
Figure 10R:
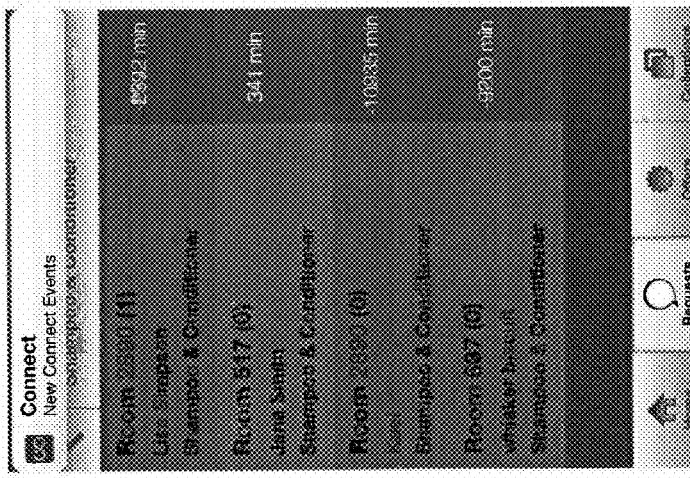
Figure 10V:
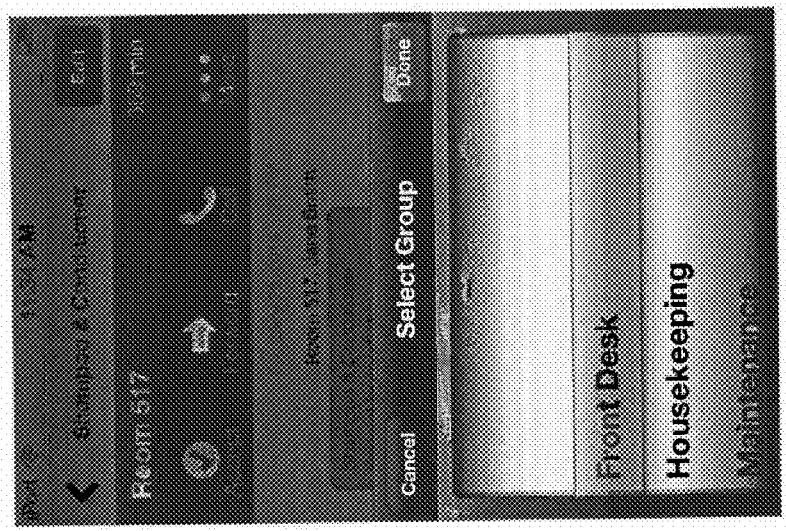
Figure 10U:
Figure 10X:
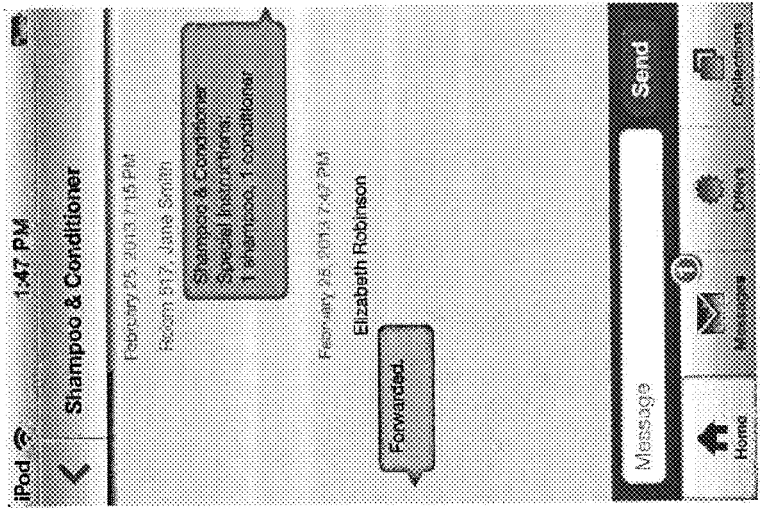
Figure 10W:
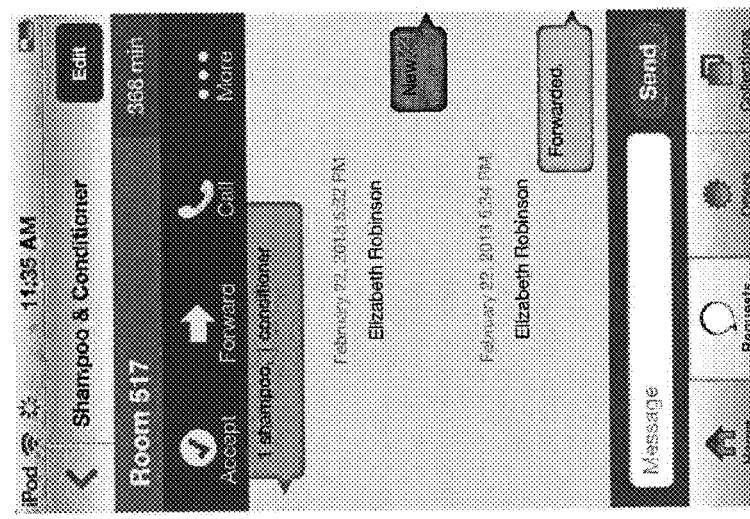
Figure 10Z:
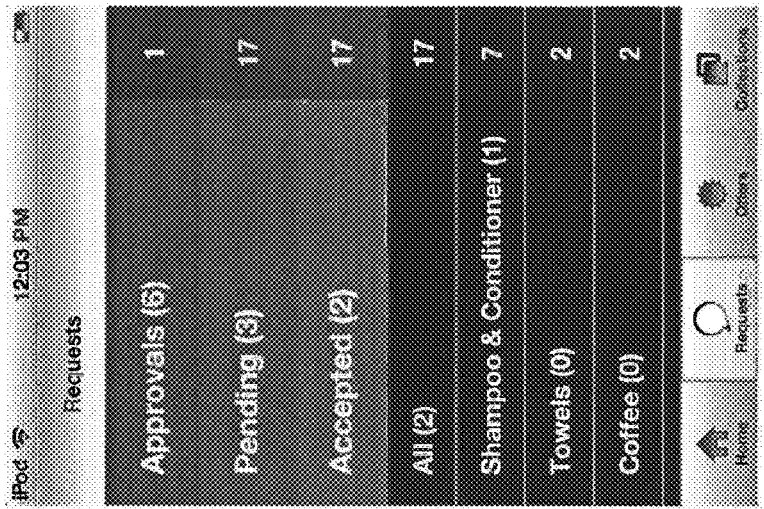
Figure 10Y:
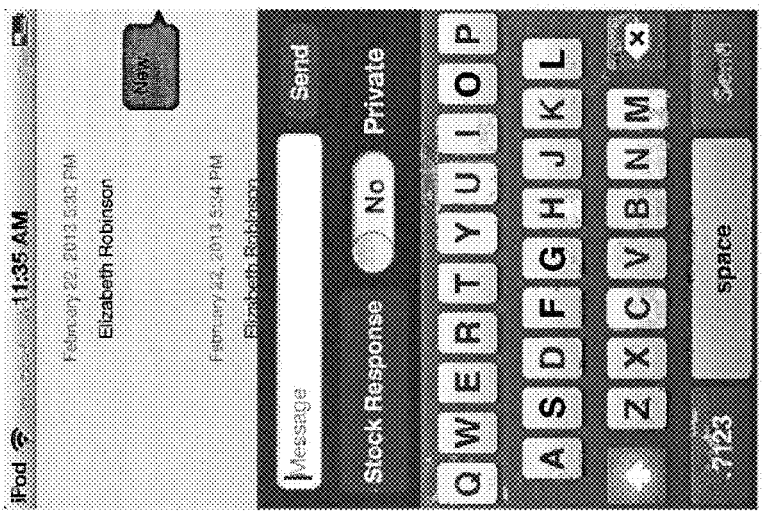

FIG. 10D shows a Staff: Home Page where the Approvals category is broken down by request type. FIG. 10E shows a Staff: Requests: Approvals: Shampoo & Conditioner page where after choosing the desired request type, staff can choose which request to manage. To interact with the request, staff can slide the request to the right to see options. They can also click on the request to interact with it.

Figure 10F:
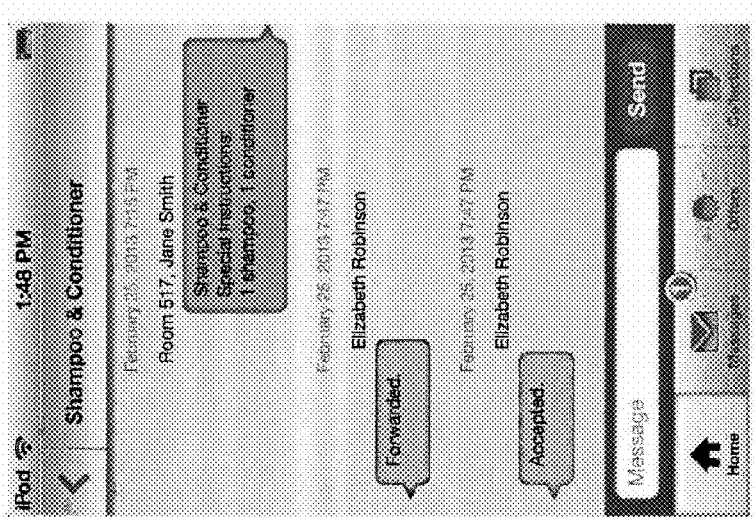
Figure 10E:
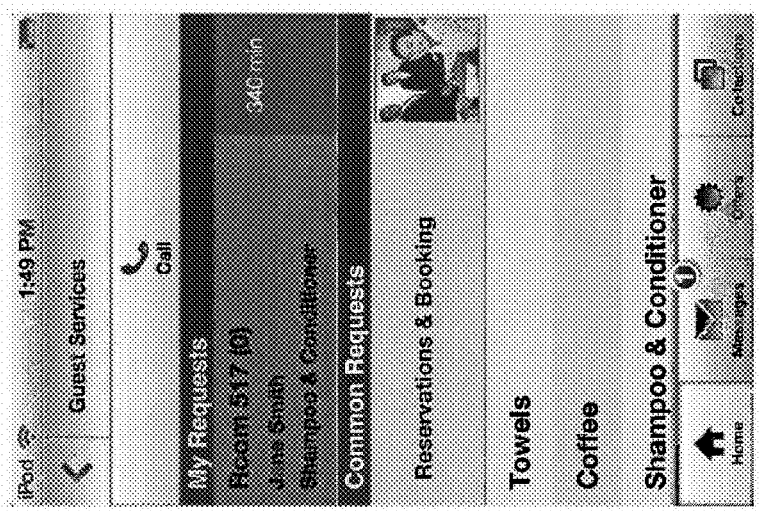

FIG. 10F shows the Staff: Requests: Approvals: Shampoo & Conditioner page where if guests slide the request to the right, they are given these options: Approve, Deny, and Block. Approval will send the request to the approvals list for further management. Denying or Blocking the request will take the request off.

FIG. 10G shows the Staff: Requests: Approvals: Shampoo & Conditioner: Room 517 page where after clicking on the request, staff are brought to this screen. They can message the guest if they'd like. They're also given the options at the top: Approve, Deny, Block. If they approve the request, it becomes a pending request. If it is denied, the guest receives a message saying it's denied and the request becomes closed. Blocked prevents future requests from coming through.

FIG. 10H shows the Staff: Requests: Pending: Shampoo & Conditioner: Room 517 page where after a staff member approves the request either using an Approve button, the request moves from the Approvals list to Pending. Once a guest's request has been approved, any further requests from the same guest will not require approval.

On the user side, FIG. 10I shows a Guest Services page where guests see their request status after it is made. They can click on it to see messages relating to the request. FIG. 10J shows a Guest Services: My Requests page where guests can see messages relating to their request as it happens. They can also send messages.

Back to the staff side, FIG. 10K shows a Staff: Requests: Pending: Shampoo & Conditioner: Room 517 page where by clicking Edit at the top right gives staff the option to set an estimated time (ETA) for completing the guest request. FIG. 10L shows the Staff: Requests: Pending: Shampoo & Conditioner: Room 517 page where the ETA options are in 5 minute intervals. Staff scroll through the options, then click Done. FIG. 10M shows the Staff: Requests: Pending: Shampoo & Conditioner: Room 517 page where after the ETA is changed, a message is sent notifying the guest.

In this way on the user side, FIG. 10N shows the Guest Services: My Requests page where guests see the status of their request as updates are made. They have the option to have a pop-up notification each time the request has an update.

Figure 10P:
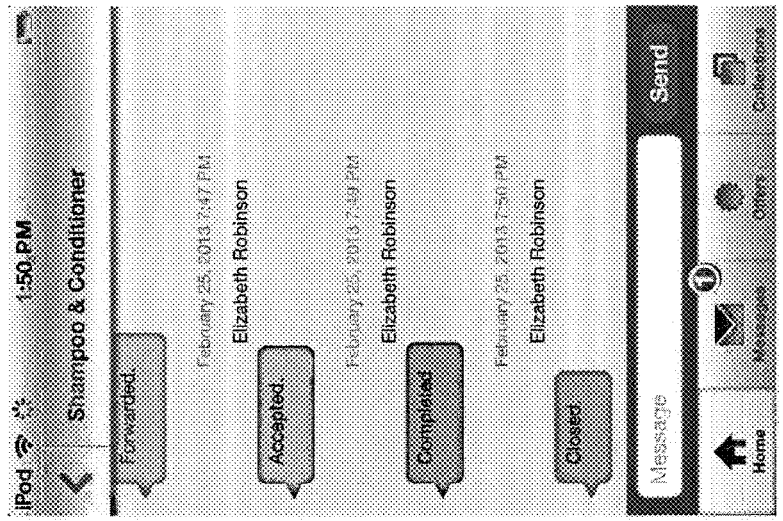
Figure 10O:
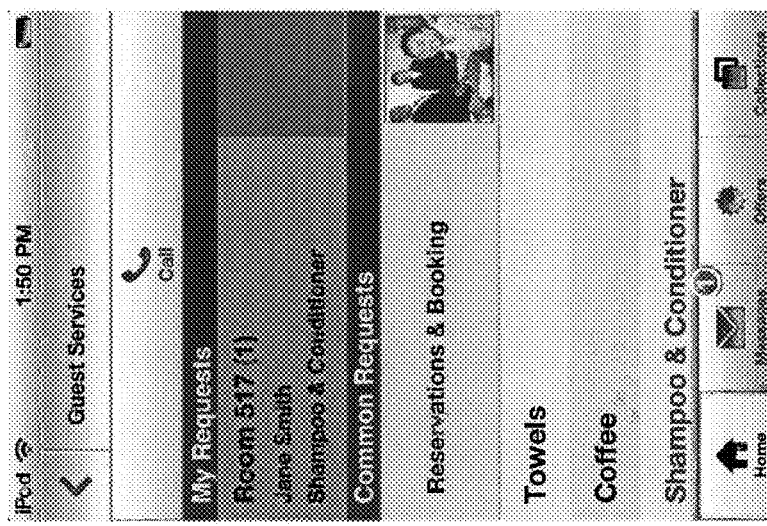

For staff, FIG. 10O shows Staff: Requests page where after the request is approved, it is found in the Pending requests list. FIG. 10P shows a Staff: Requests: Pending: Shampoo & Conditioner page where after clicking on the specific request type, in this case Shampoo & Conditioner, staff are brought to the pending requests for that type.

FIG. 10Q shows the Staff: Requests: Pending: Shampoo & Conditioner page where staff can slide a specific request to the right to view options: Accept, Forward, or Follow. FIG. 10R shows the Staff: Requests: Pending: Shampoo & Conditioner page where if a staff member accepts the request, it will turn green, the Accepted Request color, and the guest will get a notification of the accepted request (seen at the top).

FIG. 10S shows the Staff: Requests: Pending: Shampoo & Conditioner page where if staff don't slide the request to the right to see options, they can click on it to see messages and options. FIG. 10T shows the Staff: Requests: Pending: Shampoo & Conditioner: Room 517 page where after a staff member clicks on a request, they are brought to this screen where they can message with the guest or choose the options above the message box.

FIG. 10U shows the Staff: Requests: Pending: Shampoo & Conditioner: Room 517: Forward page where staff have the option to forward a request to a certain group. FIG. 10V shows the Staff: Requests: Pending: Shampoo & Conditioner: Room 517: Forward page where, in this case, in response to this selection request handler 182 will forward the request to the Front Desk group to take care of the Shampoo and Conditioner request.

FIG. 10W shows the Staff: Requests: Pending: Shampoo & Conditioner: Room 517 page where after a request is forwarded, a message is sent notifying all staff and the guest that it was forwarded.

For a user, FIG. 10X shows the Guest Services: My Requests page where the guest can see that the request was forwarded.

FIG. 10Y shows the Staff: Requests: Pending: Shampoo & Conditioner: Room 517: Message page, where if a staff member wants to send a message to the guest, they click in the Message box, and the keyboard pops up.

Accepted requests processing will be discussed next. FIG. 10Z shows the Staff: Requests page where after a request is Accepted, it is found in the Accepted Requests list. FIG. 10AA shows the Staff: Requests: Accepted: Shampoo & Conditioner page showing the Accepted Requests list. In the same manner as all the other stages, staff can slide a specific request to the right to see options, or they can click on it to see the messages and options.

FIG. 10BB shows the Staff: Requests: Accepted: Shampoo & Conditioner page where this is what it looks like when a staff member slides the request to the right. Here, they can close, forward, or follow the request.

FIG. 10CC shows the Staff: Requests: Accepted: Shampoo & Conditioner page where if guests would rather click on the request (seen here in highlight), it will bring them to the screen seen in FIG. 10DD.

FIG. 10DD shows the Staff: Requests: Accepted: Shampoo & Conditioner: Room 517 page where when staff click on the request, they are brought to this screen. Like the others, they can send a message or choose from the options at the top: Close, Forward, Call, and more.

For users, FIG. 10EE shows the Guest Services page where guests see in Connect that their request has changed to green (or other color or indication), meaning it has been accepted. FIG. 10FF shows the Guest Services: My Requests page where the guest can see a message letting them know that the request was accepted.

Back to staff, FIG. 10GG shows the Staff: Requests: Accepted: Shampoo & Conditioner: Room 517: Message page where staff can send a message by clicking in the Message box.

FIG. 10HH shows the Staff: Requests: Accepted: Shampoo & Conditioner: Room 517: Message page where if a staff member completes the request, for example, they can message to the guest and others that it has been completed.

FIG. 10II shows the Staff: Requests: Accepted: Shampoo & Conditioner: Room 517 page where the message sent shows up in the message box, and it is sent to the guest. From this screen, staff also have the options at the top. They can choose to close the request, but they can also do this using other options. Once again a user can see as shown in FIG. 10JJ a Guest Services: My Requests page where the guest is sent the message that the request has been completed.

FIG. 10KK shows the Staff: Requests page where once the request has been closed, it will be found in the Closed list.

FIG. 10LL shows the Staff: Requests: Closed: Shampoo & Conditioner page where staff can look at the closed requests by category. They can move the list up and down by touching and moving it in the direction they want. When staff click on the request, they are brought to the message screen shown in FIG. 10MM.

FIG. 10MM shows the Staff: Requests: Closed: Shampoo & Conditioner: Room 517 page where at the message screen, staff can see the entire history of the request. They can use the options at the top or send a message to the guest. This is also where they can see any messages the guest has sent. If staff hit the More button, they will see the options shown in FIG. 10NN. FIG. 10NN shows the Staff: Requests: Closed: Shampoo & Conditioner: Room 517 page where the extended options shown here are what is displayed when staff press the More button.

Back to the user experience, FIG. 10OO shows the Guest Services page where after the request is closed, guests will see the color changed to blue (or other color or indication). FIG. 10PP shows the Guest Services: My Requests page where when the guest clicks on the request, they can see a message that it is closed along with all the steps before its completion.

(h) Example Data Flow for Queuing And Processing Requests from a Customer

Figure 11A:
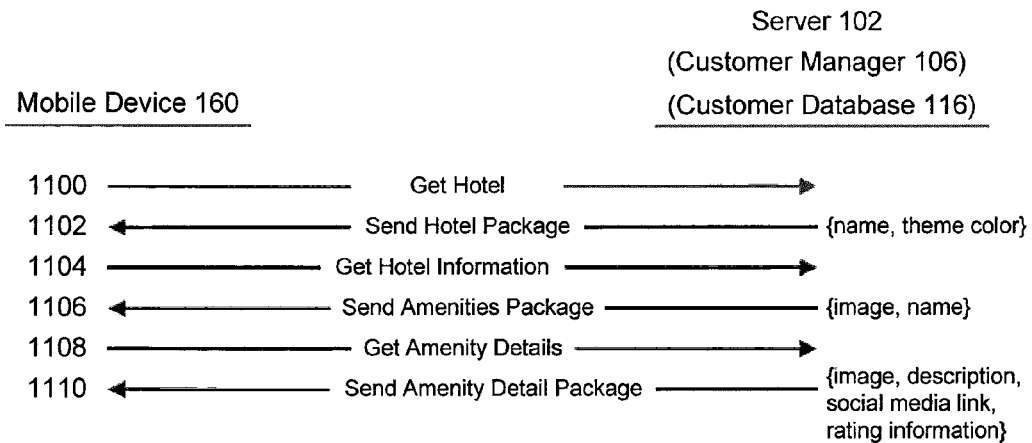
FIGS. 11A-11C are diagrams that show examples of data flow between a customer mobile device and server to queue requests made by a customer.
Figure 11B:
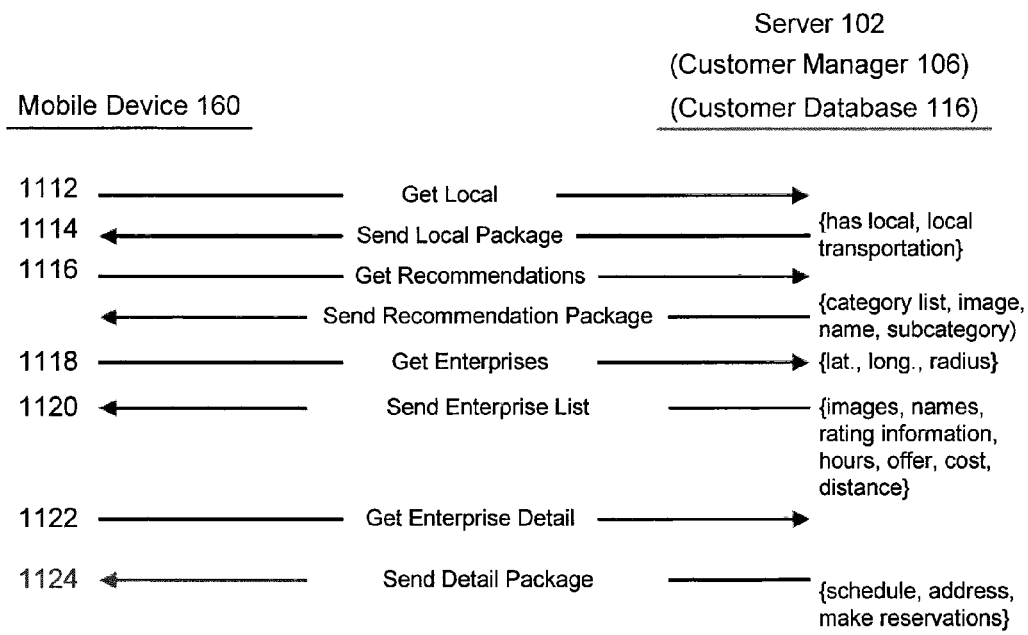
Figure 11C:
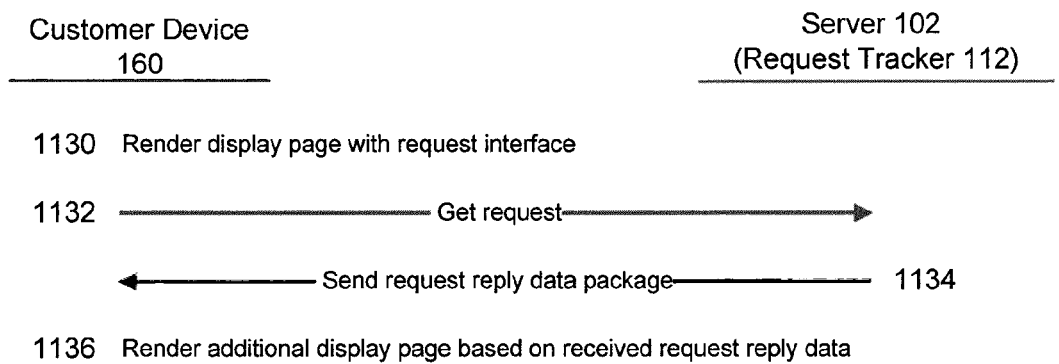

Examples of data flow for data requests and responses between a customer mobile device 160 running concierge agent 161 and server 102 are described with respect to FIGS. 11A-11C.

As shown in FIG. 11A, customer mobile device A1 160 can launch concierge agent 161 which sends a get hotel request along with the location information to server 102 (step 1100). In response, server 102 with customer manager 106 and/or business manager 108 processes the data request and returns a data package having data (such as name, theme color, and other data) that defines branded interface 600 (step 1102). Data can be accessed from customer database 116 and/or business database 118. A customer can select an interface which turn causes additional requests to get more information to be sent to server 102 and corresponding to data package to be sent back. As shown in FIG. 11A, a customer may select Hotel Info which causes a get hotel information request to be sent (step 1104), and a corresponding amenities data package with hotel amenity details to be sent back (step 1106). A customer may further select a particular amenity which causes a get amenity details request to be sent (step 1108), and a corresponding amenity detail data package to be sent back (step 1110). Data making up the returned data packages can be accessed from customer database 116 and/or business database 118.

FIG. 11B shows further examples of data flow where a customer selects Local on branded interface 600 which turn causes additional requests to get more information to be sent to server 102 and corresponding to data package to be sent back (steps 1112-1124). A customer may select Local which causes a get local information request to be sent (step 1112), and a corresponding local data package with local information including an option for a recommendations interface to be sent back (step 1114). A customer may further select recommendation which causes a get recommendation request to be sent (step 1116), and a corresponding recommendation data package to be sent back (step 1118). Further selection can be made to get enterprise information (steps 1118, 1122) and receive corresponding data packages (steps 1120, 1124). Data making up the returned data packages can be accessed from customer database 116 and/or business database 118.

FIG. 11C shows further examples of data flow. Concierge agent 161 for example may render a display page on customer device 160 with a request interface (step 1130). Such a page can be for example any one or more of the interfaces or pages described above for a user or customer to select or input a request. This cause a get request to be sent to server 102 and a corresponding data package to be sent back (steps 1132 and 1134). Additional display pages can be rendered based on the returned data package (step 1136). Data making up the returned data package can be accessed from customer database 116 and/or business database 118 depending on the request made in step 1132.

Figure 11D:
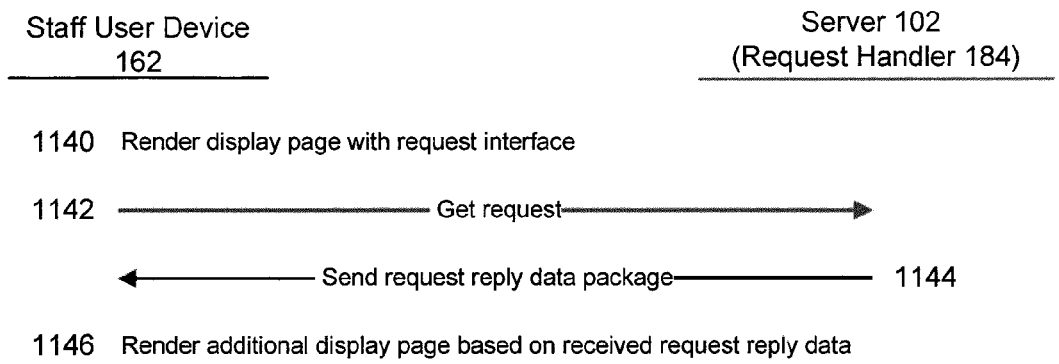
FIG. 11D is a diagram that show examples of data flow between a staff user mobile device and server to handle queued requests made by a customer.

Examples of the data flow for data requests and responses between a user mobile device 162 running concierge staff agent 163 and server 102 are described with respect to FIG. 11D. FIG. 11D shows further examples of data flow. Concierge agent 163 for example may render a display page on staff user device 162 with a request interface (step 1140). Such a page can be for example any one or more of the interfaces or pages described above for a staff user or customer to select to handle an outstanding request. This cause a get request to be sent to server 102 and a corresponding data package to be sent back (steps 1142 and 1144). Additional display pages can be rendered based on the returned data package (step 1146). Data making up the returned data package can be accessed from user database 114 and/or business database 118 depending on the request made in step 1142.

According to a feature, these data flows involving repeated get request and send responses concierge agent 161 and concierge staff agent 163 to take advantage of updated data in the user database 114, customer database 116, and/or business database 118. In an example, concierge agent 161 and concierge staff agent 163 can then be more lightweight and not a large enterprise software components. These examples are illustrative and not intended to be limiting.

(i) Example Computing Devices

Various embodiments can be implemented, for example, using one or more computing devices. A computing device can be any type of device having one or more processors. For example, a computing device can be a workstation, mobile device (e.g., a mobile phone; personal digital assistant, tablet or laptop), computer, server, computer cluster, server farm, game console, set-top box, kiosk, embedded system, computer system such as computer system 1300, or other device having at least one processor and memory.

Customer mobile devices 160 and user mobile devices 162 can each be implemented for example on a mobile computing device including but not limited to a mobile phone, personal digital assistant, tablet or laptop, game console, set-top box, embedded system or other device having at least one processor and memory. Concierge agent 161 and concierge staff agent 163 can be implemented in software, firmware, hardware, or a combination thereof.

User console 104 and server 102 including request management system 150 (with its components user manager 104, business manager 108, and customer manager 106) likewise can be implemented on one or more computing devices at the same or different locations. Server 102 including request management system 150 (with its components user manager 104, business manager 108, and customer manager 106) for example can be implemented on a computer cluster or a server farm on different computing devices over a cloud, and can each have their functionality distributed across different computing devices depending upon a particular implementation.

Similarly, user database 114, customer database 116, and business database 118 can be stored on any type of storage device including, but not limited to, memory. In one example, user database 114, customer database 116, and business database 118 can each be a database in structured memory, such as, a relational database stored in persistent memory on one or more devices at the same or different locations. User database 114, customer database 116, and business database 118 can also be stored over a network at different locations and/or in computing cloud.

Figure 13:
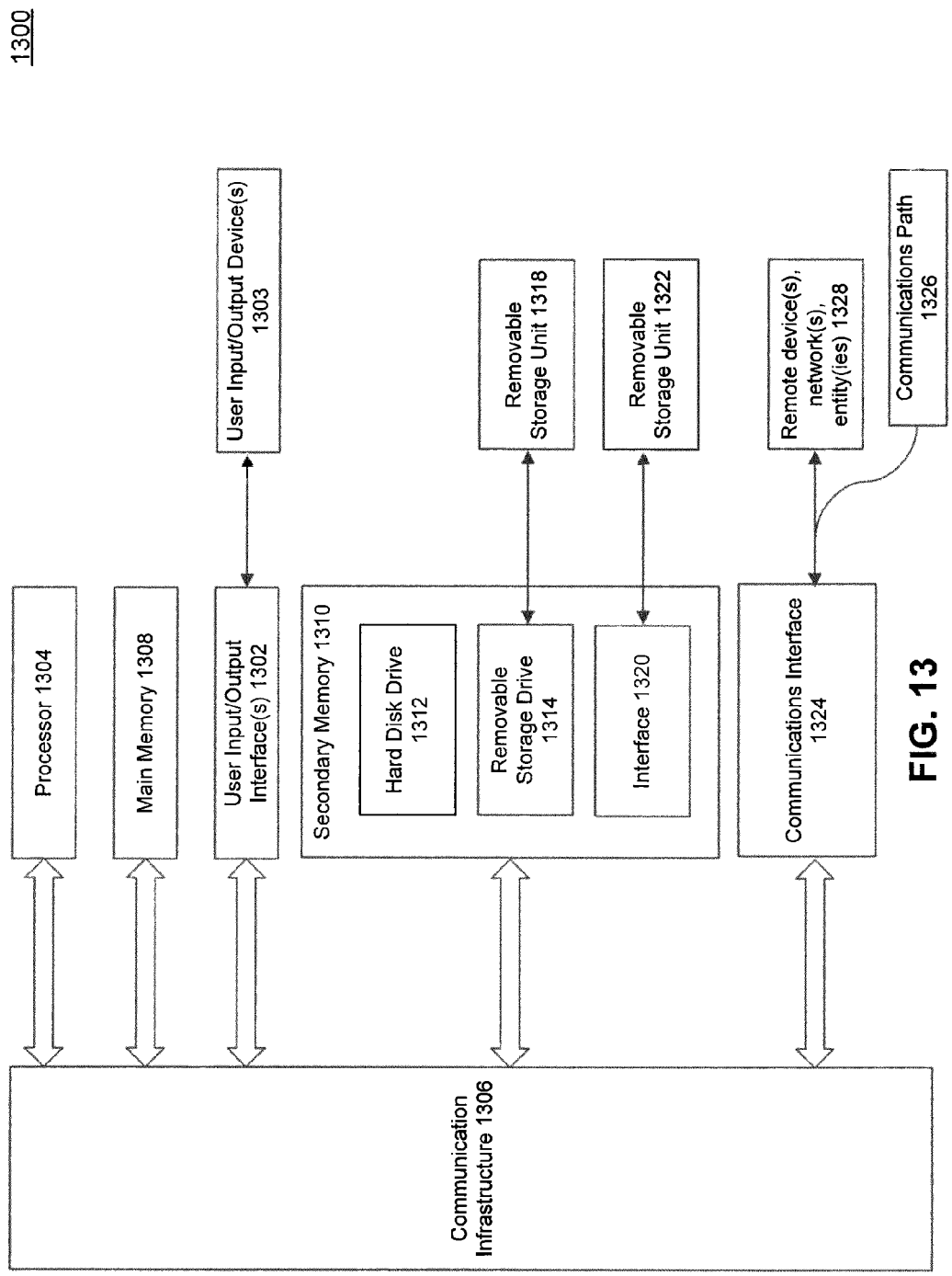
FIG. 13 is an example computer system that is useful for implementing various embodiments.

Various embodiments can be implemented, for example using one or more well-known computer systems, such as computer system 1300 shown in FIG. 13. Computer system 1300 can be any well-known computer capable of performing the functions described herein, such as computers available from INTERNATIONAL BUSINESS MACHINES, APPLE, SUN, HP, DELL, SONY, TOSHIBA, etc.

Computer system 1300 includes one or more processors (also called central processing units, or CPUs), such as a processor 1304. Processor 1304 is connected to a communication infrastructure or bus 1306.

Computer system 1300 also includes user input/output device(s) 1303, such as monitors, keyboards, pointing devices, etc., which communicate with communication infrastructure 606 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 13. In particular, embodiments may operate with software, hardware, and/or operating system implementations other than those described herein. This can include but is not limited (j) Conclusion The Title, Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for receiving requests using a request management system comprising:
   establishing a wireless network connection between a customer's mobile device and a server including at least one processor;
   determining, by a geolocation service at the server, a geolocation of the customer's mobile device;
   determining, by the server, a selectable set of data describing goods or services currently offered by a business location associated with the geolocation of the customer's mobile device;
   providing, via the wireless network connection, the selectable set of data to the customer's mobile device based on the geolocation determined by the server;
   receiving, from the customer's mobile device, a request based on a selection from the selectable data set;
   determining, by the server, a queue stored at the server and associated with one or more groups assigned to fulfill the request based on a request type and the geolocation;
   adding the request to the queue associated with the one or more groups assigned to fulfill the request based on the request type and the geolocation;
   establishing a network connection between the server and a staff mobile device associated with the one or more groups assigned to fulfill the request; and
   providing the queue to the staff's mobile device associated with the one or more groups.

2. The computer-implemented method of claim 1, further comprising:
   generating a list of one or more business locations based on a serviceable distance of the mobile device's geolocation;
   providing the list of business locations to the customer's mobile device; and
   receiving a selection from the customer's mobile device selecting a particular business location from the list of business locations.

3. The computer-implemented method of claim 1, further comprising:
   providing to the customer's mobile device a customized brand display based on settings configured by a business user.

4. The computer-implemented method of claim 1, the receiving further comprising:
   processing a message which includes the request type, a time and date of the request, a need by input value, an indication of one or more options selected by the customer, and associated metadata.

5. The computer-implemented method of claim 4, wherein the associated metadata includes a link and a priority indicator configured to trace requests in the request management system.

6. The computer-implemented method of claim 1, the adding further comprising:
   identifying one or more groups assigned in the request management system to fulfill the request type.

7. The computer-implemented method of claim 1, the groups comprising one or more users assigned to each group in the request management system.

8. A request management system, comprising:
   a memory; and
   at least one processor coupled to the memory and configured to:
   establish a wireless network connection between a customer's mobile device and the least one processor;
   determine a geolocation of the customer's mobile device;
   determine a selectable set of data describing goods or services offered by a business location associated with the geolocation of the customer's mobile device;
   provide, via the wireless network connection, the selectable set of data to the customer's mobile device based on the geolocation determined by the processor;
   receive, from the customer's mobile device, a request based on a selection from the selectable data set;
   determine a queue associated with one or more groups assigned to fulfill the request based on a request type and geolocation;
   add the request to the queue associated with the one or more groups assigned to fulfill the request based on the request type and geolocation;
   establish a network connection between the processor and a staff mobile device associated with the one or more groups assigned to fulfill the request; and
   provide the queue to the staff's mobile device associated with the one or more groups.

9. The system of claim 8, wherein the at least one processor is further configured to:
   generate a list of one or more business locations based on a serviceable distance of the mobile device's geolocation;
   provide the list of business locations to the customer's mobile device; and receive a selection from the customer's mobile device selecting a particular business location from the list of business locations.

10. The system of claim 8, wherein the at least one processor is further configured to:
provide to the customer's mobile device a customizable brand display based on settings configured by a business user.

11. The system of claim 8, wherein the at least one processor when receiving is further configured to:
process a message which includes the request type, a time and date of the request, a need by input value, an indication of one or more options selected by the customer, and associated metadata.

12. The system of claim 11, wherein the associated metadata includes a link and a priority indicator configured to trace requests in the request management system.

13. The system of claim 8, wherein the at least one processor when adding is further configured to:
identify the one or more groups assigned in the request management system to fulfill the request type.

14. The system of claim 8, wherein
the groups comprise one or more users assigned to each group in the request management system.

15. A non-transitory computer-readable device having instructions stored thereon that, when executed by at least one computing device, causes the at least one computing device to perform operations in a request management system comprising:
establishing a wireless network connection between a customer's mobile device and a server including at least one processor;
determining, by a geolocation service at the server, a geolocation of the customer's mobile device;
determining, by the server, a selectable set of data describing goods or services currently offered by a business location associated with the geolocation of the customer's mobile device;
providing, via the wireless network connection, the selectable set of data to the customer's mobile device based on the geolocation determined by the server;
receiving, from the customer's mobile device, a request based on a selection from the selectable data set;
determining, by the server, a queue stored at the server and associated with one or more groups assigned to fulfill the request based on a request type and the geolocation;
adding the request to the queue associated with the one or more groups assigned to fulfill the request based on the request type and the geolocation;
establishing a network connection between the server and a staff mobile device associated with the one or more groups assigned to fulfill the request; and
providing the queue to the staff's mobile device associated with the one or more groups.

16. The computer-readable device of claim 15, the operations further comprising:
generating a list of one or more business locations based on a serviceable distance of the mobile device's geolocation;
providing the list of business locations to the customer's mobile device; and
receiving a selection from the customer's mobile device selecting a particular business location from the list of business locations.

17. The computer-readable device of claim 15, the operations further comprising:
providing to the customer's mobile device a customized brand display based on settings configured by a business user.

18. The computer-readable device of claim 15, the operation of receiving further comprising:
processing a message which includes the request type, a time and date of the request, a need by input value, an indication of one or more options selected by the customer, and associated metadata.

19. The computer-readable device of claim 18, wherein the associated metadata includes a link and a priority indicator configured to trace requests in the request management system.

20. The computer-readable device of claim 15, wherein the groups comprise one or more users assigned to each group in the request management system.

* * * * *

UNITED STATES PATENT AND TRADEMARK OFFICE
CERTIFICATE OF CORRECTION

| | |
|---|---|
| PATENT NO. | : 9,436,958 B2 |
| APPLICATION NO. | : 13/842177 |
| DATED | : September 6, 2016 |
| INVENTOR(S) | : Robinson et al. |

It is certified that error appears in the above-identified patent and that said Letters Patent is hereby corrected as shown below:

In the Claims

In Column 30, Line 36, replace "and the least one" with --and the at least one--.

In Column 30, Line 46, replace "the processor" with --the at least one processor--.

In Column 30, Line 56, replace "the processor" with --the at least one processor--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*